(12) United States Patent
Oh et al.

(10) Patent No.: US 12,506,374 B2
(45) Date of Patent: Dec. 23, 2025

(54) ROTOR AND MOTOR COMPRISING SAME

(71) Applicant: LG INNOTEK CO., LTD., Seoul (KR)

(72) Inventors: Se Young Oh, Seoul (KR); Ju Hwan Ku, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 736 days.

(21) Appl. No.: 17/758,613

(22) PCT Filed: Dec. 30, 2020

(86) PCT No.: PCT/KR2020/019392
§ 371 (c)(1),
(2) Date: Jul. 11, 2022

(87) PCT Pub. No.: WO2021/141318
PCT Pub. Date: Jul. 15, 2021

(65) Prior Publication Data
US 2023/0050704 A1    Feb. 16, 2023

(30) Foreign Application Priority Data

Jan. 9, 2020  (KR) .......................... 10-2020-0003275
Mar. 6, 2020  (KR) .......................... 10-2020-0028187

(51) Int. Cl.
*H02K 1/28*     (2006.01)
*B62D 5/04*    (2006.01)
(Continued)

(52) U.S. Cl.
CPC ................. *H02K 1/28* (2013.01); *B62D 5/04* (2013.01); *H02K 1/278* (2013.01); *H02K 21/14* (2013.01); *H02K 21/22* (2013.01)

(58) Field of Classification Search
CPC .......... H02K 1/28; H02K 1/278; H02K 21/14; H02K 21/22; H02K 2213/03; B62D 5/04; B62D 5/0403
See application file for complete search history.

(56) References Cited

U.S. PATENT DOCUMENTS

2014/0300243 A1* 10/2014 Berkouk .............. H02K 1/2773
                                                                310/216.048
2016/0254714 A1    9/2016 Hashizume
(Continued)

FOREIGN PATENT DOCUMENTS

JP    2009-106065 A    5/2009
JP    2011-67057 A     3/2011
(Continued)

OTHER PUBLICATIONS

Office Action dated Feb. 5, 2025 in Korean Application No. 10-2020-0003275.
(Continued)

*Primary Examiner* — Thomas Truong
(74) *Attorney, Agent, or Firm* — SALIWANCHIK, LLOYD & EISENSCHENK

(57) ABSTRACT

An embodiment discloses a motor comprising: a stator; a rotor disposed to correspond to the stator; and a shaft coupled to the rotor. The rotor includes a rotor core coupled to the shaft, a plurality of magnets disposed outside the rotor core, and a can disposed to cover the rotor core and the magnets. The can includes a base, a body extending from the base in the axial direction, and a plurality of extension portions extending from the end portion of the body, wherein with reference to the radial direction, the radius R2 from the center C to the extension portions is longer than the radius R1 from the center C to the body. Accordingly, the motor can induce easy insertion of the magnets by using the can having two regions having different radii, thereby simplifying a manufacturing process of the motor and improving productivity thereof.

9 Claims, 23 Drawing Sheets

(51) Int. Cl.
*H02K 1/27* (2022.01)
*H02K 1/278* (2022.01)
*H02K 21/14* (2006.01)
*H02K 21/22* (2006.01)

(56) References Cited

U.S. PATENT DOCUMENTS

2018/0123411 A1* 5/2018 Kawaguchi .......... H02K 15/026
2021/0013754 A1* 1/2021 Schmid .................. H02K 1/278

FOREIGN PATENT DOCUMENTS

| KR | 10-2007-0092812 A | 9/2007 |
| KR | 10-2013-0085337 A | 7/2013 |
| KR | 10-2016-0112412 A | 9/2016 |
| KR | 10-2017-0102747 A | 9/2017 |
| KR | 10-2018-0085230 A | 7/2018 |

OTHER PUBLICATIONS

Office Action dated Feb. 7, 2025 in Korean Application No. 10-2020-0028187.
International Search Report dated Mar. 30, 2021 in International Application No. PCT/KR2020/019392.

* cited by examiner (a)

(b)

(c)

1410c

1411c

1411c

ROTOR AND MOTOR COMPRISING SAME

CROSS-REFERENCE TO RELATED APPLICATIONS

This application is the U.S. national stage application of International Patent Application No. PCT/KR2020/019392, filed Dec. 30, 2020, which claims the benefit under 35 U.S.C. § 119 of Korean Application No. 10-2020-0003275, filed Jan. 9, 2020 and Korean Application No. 10-2020-0028187, filed Mar. 6, 2020, the disclosures of each of which are incorporated herein by reference in their entirety.

TECHNICAL FIELD

The present invention relates a rotor and a motor including the same.

BACKGROUND ART

Motors are apparatuses configured to convert electrical energy to mechanical energy to obtain rotational forces and are widely used for vehicles, home appliances, industrial machines, and the like. Particularly, a motor can be used in an apparatus for securing steering stability of a vehicle. For example, a motor can be used as a motor for a vehicle such as for an electronic power steering (EPS) system.

The motor may include a housing, a shaft, a stator disposed on an inner circumferential surface of the housing, a rotor disposed on an outer circumferential surface of the shaft, and the like. In this case, the stator induces an electrical interaction with the rotor to induce rotation of the rotor.

The rotor may include a rotor core and a plurality of magnets disposed on the rotor core. According to a position at which the magnets are disposed, the rotor may be divided into an internal permanent magnet (IPM) type rotor in which magnets are disposed in a rotor core or a surface permanent magnet (SPM) type rotor in which magnets are attached to a surface of a rotor core.

In the case of the SPM type rotor, due to a structural feature, the magnets are attached to the rotor core using an adhesive member. In addition, a can may be used to improve durability of assembly of the magnets and the rotor core.

The can may serve to not only protect the rotor but also inhibit separation of the magnets. In this case, the adhesive member may be applied on an inner side of the can to fix the can to the rotor core on which the magnets are disposed.

However, there is a problem of increasing the number of processes due to two coating processes with the adhesive (a bonding process for coupling the rotor core and the magnets and a bonding process of applying the adhesive member on an interior of the can).

In this case, since the plurality of magnets are present, there is a problem of increasing a production time due to a process of bonding the magnets. In addition, when the can is assembled, since an operator manually assembles the can due to a difficulty in automation according to a structure of the can, there is a problem of increasing a manufacturing time. In addition, such a problem acts as a fact lowering the productivity of a motor.

Accordingly, a rotor of which assembly automation is implemented and productivity is improved and a motor including the same are required. In addition, a rotor core, of which productivity is improved and separation of the magnets is also inhibited by removing a bonding process of magnets of the motor, and a motor including the same are required.

TECHNICAL PROBLEM

The present invention is directed to providing a rotor, from which a bonding process applied to magnets is removed using coupling between the rotor core and a can and in which separation of the magnets from a rotor core is inhibited, and a motor including the same.

The present invention is directed to providing a rotor core, in which separation of magnets are inhibited without performing a bonding process, and a motor including the same.

Objectives to be solved by embodiments are not limited to the objectives described above, and objectives which are not described above will be clearly understood by those skilled in the art from the following descriptions.

TECHNICAL SOLUTION

One aspect of the present invention provides a motor including a stator, a rotor disposed to correspond to the stator, and a shaft coupled to the rotor, wherein the rotor includes a rotor core coupled to the shaft, a plurality of magnets disposed on an outer side of the rotor core, and a can disposed to cover the rotor core and the magnets, the can includes a base, a body extending from the base in an axial direction, and a plurality of extension parts extending from an end portion of the body, each of the extension parts includes a first region spaced apart from each of the magnets in a radial direction and a second region extending from the first region, and a radius (R2) from a center (C) to the first region is greater than a radius (R1) from the center (C) to the body in the radial direction.

An end portion of the body may be disposed at a lower level than an upper surface of the magnet, and the second region may cover the upper surface of the magnet. For example, the second region which is an upper portion of the extension part may be bent to cover the upper surface of the magnet, and a lower end of the first region which is a lower portion of the extension part may be disposed at a lower level than the upper surface of the magnet.

Alternatively, an end portion of the body may be disposed at the same level as the upper surface of the magnet, and the second region may cover the upper surface of the magnet. For example, the second region which is an upper portion of the extension part may be bent to cover the upper surface of the magnet, and a lower end of the first region which is a lower portion of the extension part may be disposed at the same level as the upper surface of the magnet.

Meanwhile, the rotor may include an adhesive member disposed between the upper surface of the magnet and the extension part.

A length (d1) of the magnet in the axial direction may be greater than a length (d2) of the rotor core in the axial direction.

The second region may include a step, and the second region may be in contact with an upper surface of the rotor core.

The step may be formed by caulking.

The base may include a protruding part protruding in the axial direction, and the protruding part may be coupled to a hole of the rotor core.

Since the plurality of extension parts are disposed apart from each other in the circumference direction, a blank may be formed between the extension parts, and the blank may be disposed to overlap a guide protruding from an outer circumferential surface of the rotor core in the radial direction.

Another aspect of the present invention provides a motor including a stator, a rotor disposed to correspond to the stator, and a shaft coupled to the rotor, wherein the rotor includes a rotor core coupled to the shaft, a plurality of magnets disposed on an outer side of the rotor core, and a can the disposed to cover the rotor core and the magnets, the can includes a base including a protruding part protruding in the axial direction, a body extending from the base in the axial direction, and a plurality of extension parts extending from an end portion of the body, the protruding part is coupled to the hole of the rotor core, and the body is disposed apart from the rotor core.

Still another aspect of the present invention provides a rotor including a rotor core, a plurality of magnets disposed on an outer side of the rotor core, and a can disposed to cover the rotor core the magnets, wherein the can includes a base, a body extending from the base in an axial direction, and a plurality of extension parts extending from an end portion of the body, and a radius (R2) from a center (C) to the extension part is a radius (R1) from the center (c) to the body in the radial direction.

The rotor core may be inserted into the can, and a hole of the rotor core may be coupled to a protruding part protruding from the body in the axial direction.

When the magnets are inserted between the rotor core and the can, the magnets may be guided by guides protruding from an outer circumferential surface of the rotor core in the radial direction.

Yet another aspect of the present invention provides a motor including a stator, a rotor disposed inside the stator, and a shaft coupled to the rotor, wherein the rotor includes a rotor core and a magnet disposed on an outer side of the rotor core, the rotor core includes a body, a protruding part formed to protrude from the body in a radial direction, and a protrusion formed to protrude from the protruding part in a circumferential direction, the protrusion includes a first protrusion and a second protrusion, the first protrusion is disposed in contact with a first surface disposed on an outer side of the magnet, and the second protrusion is disposed in contact with a second surface of the magnet in the circumferential direction.

When the magnet is inserted into the rotor core, a part of the magnet may be disposed between the first protrusion and an outer surface of the body in the radial direction, the second protrusion may be bent in the axial direction to be in contact with the second surface of the magnet in the circumferential direction.

The protruding part may include a first protruding part on which the first protrusion is disposed and a second protruding part on which the second protrusion is disposed, and a width (W1) of the first protruding part in the circumferential direction may be greater than a width (W2) of the second protruding part in the circumferential direction.

The second protruding part may be disposed apart from the second surface of the magnet in the circumferential direction.

A part of the second protrusion may be disposed to overlap the first protruding part in the axial direction.

The first protruding part may include a hole formed to pass through the first protruding part in the axial direction.

Yet another aspect of the present invention provides a motor including a stator, a rotor disposed inside the stator, and a shaft coupled to the rotor, wherein the rotor includes a rotor core and a magnet disposed on an outer side of the rotor core, the rotor core is formed by stacking a plurality of plates, the plates includes first plates and second plates, each of the first plates includes a first plate body, a first protruding part protruding from the first plate body in a radial direction, and a first protrusion protruding from an end portion of the first protruding part in a circumferential direction, each of the second plates includes a second plate body, a second protruding part protruding from the second plate body in the radial direction, and a second protrusion protruding from an end portion of the second protruding part in the circumferential direction, and when the magnet is inserted into the rotor core, a part of the magnet is disposed between the first protrusion and an outer surface of the body in the radial direction, and the second protrusion is bent in the axial direction to be in contact with a second surface of the magnet in the circumferential direction.

A width (W1) of the first protruding part in the circumferential direction may be greater than a width (W2) of the second protruding part in the circumferential direction.

The second protruding part may be disposed apart from the second surface of the magnet in the circumferential direction.

A part of the second protrusion may be disposed to overlap the first protruding part in the axial direction.

The first protruding part may include a hole formed to pass through the protruding part in the axial direction.

The second plate may be disposed between the first plates. In this case, the plates may include a third plate disposed between the first plate and the second plate or between the second plates, the third plate may include a third plate body and a third protruding part protruding from the third plate body in the radial direction, and the third protruding part may be formed in the same shape as the second protruding part. In addition, the plurality of second plates may be disposed apart from each other in the axial direction by the first plate and the third plate, and a separation distance (D2) between the second plates may be greater than or equal to a protruding length (L2) of the second protrusion in the circumferential direction.

End portions of the second protrusions which are disposed to face each other in the circumferential direction may be formed to have a predetermined gap (G). In this case, a protruding length (L2) of the second protrusion in the circumferential direction may be greater than a thickness (t) of each of the plates.

Yet another aspect of the present invention provides a rotor including a rotor core and a magnet inserted into and coupled to the rotor core in an axial direction, wherein the rotor core is formed by stacking a plurality of plates, the plates include first plates and second plates, each of the first plates includes a first plate body, a first protruding part protruding from the first plate body in a radial direction, and s first protrusion protruding from an end portion of the first protruding part in a circumferential direction, each of the second plates includes a second plate body, a second protruding part protruding from the second plate body in the radial direction, and a second protrusion protruding from an end portion of the second protruding part in the circumferential direction, and when the magnet is inserted into the rotor core, a part of the magnet is disposed between the first protrusion and an outer surface of the body in the radial direction, and the second protrusion is bent in the axial direction to be in contact with a second surface of the magnet in the circumferential direction.

A part of the second protrusion may be disposed to overlap the first protruding part in the axial direction.

The plates may further include a third plate disposed between the first plate and the second plate or between the second plates.

The third plate may include a third plate body and a third protruding part protruding from the third plate body in the radial direction, and the third protruding part may be formed in the same shape as the second protruding part. In this case, the rotor core may include the plurality of second plates disposed apart from each other in the axial direction, a separation distance (d2) between the second plates may be greater than or equal to a length (L2) of the second protrusion in the circumferential direction.

ADVANTAGEOUS EFFECTS

According to embodiments, by using a can having a basket shape of which an inlet is widened and an arrangement of a rotor core inserted into and coupled to the can, a conventional bonding process to be performed on a magnet can be removed and manufacturing automation of a rotor can also be implemented. That is, insertion of a magnet can be easily guided using the can having two regions of which radii are different. Accordingly, a manufacturing process of a motor can be simplified to improve productivity.

In addition, separation of the magnet can be inhibited by bending an extension part formed on the can to fix the magnet disposed between the rotor core and the can.

According to the embodiments, separation of the magnet can be inhibited by supporting the magnet using a protrusion protruding from a protruding part of the rotor core. Particularly, the magnet can be supported using an elastic restoring force of the protrusion that is bent through a process of inserting the magnet into the rotor core.

In addition, since the magnet can be supported using only the protrusion, a bonding process for attaching the magnet to the rotor core can be removed. Accordingly, the productivity of the motor can be improved.

Various useful advantages and effects of the embodiments are not limited to the content described above and may be easily understood while the specific embodiments are described.

DESCRIPTION OF DRAWINGS

FIG. 10 shows views illustrating a process of manufacturing the rotor according to the embodiment, wherein

MODES OF THE INVENTION

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more)

among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
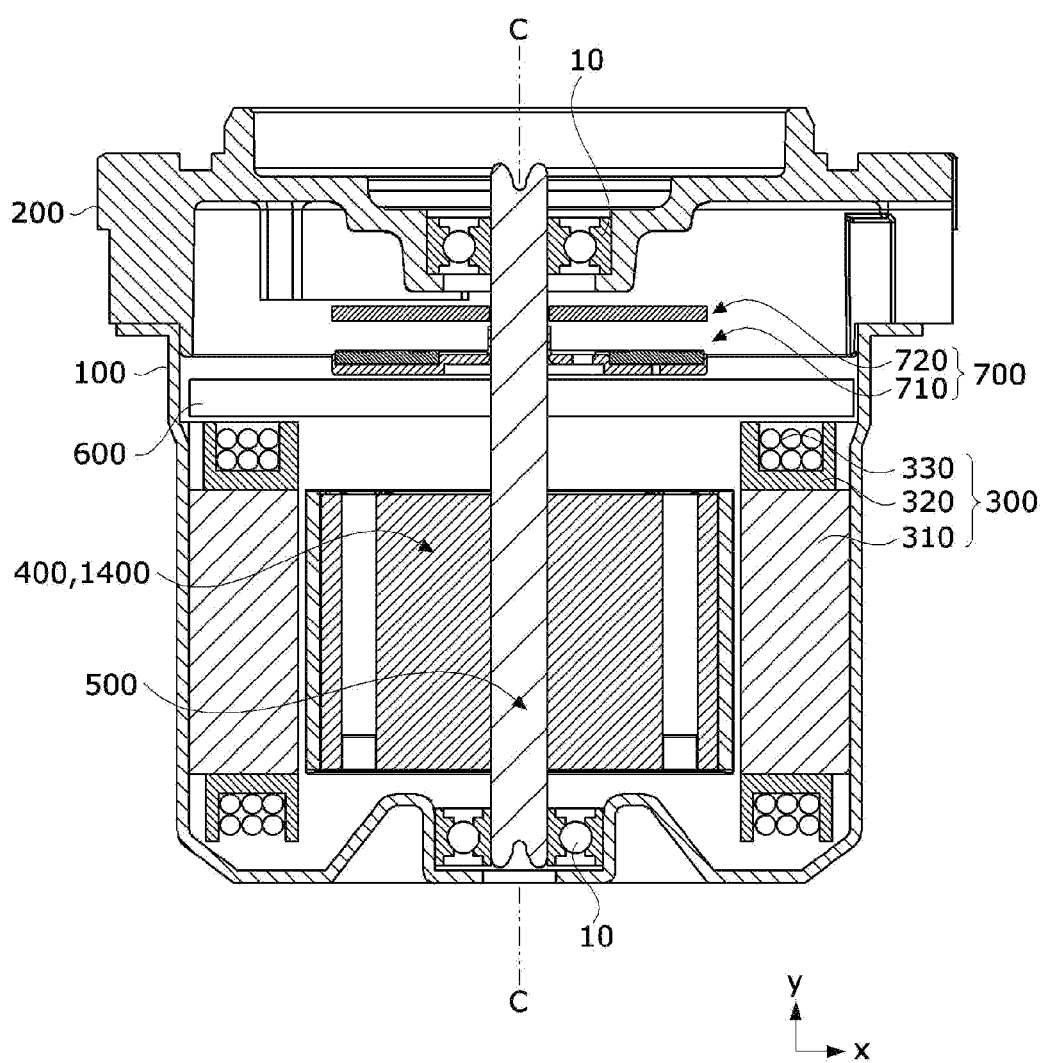
FIG. 1 is a view illustrating a motor according to an embodiment.
Figure 2:
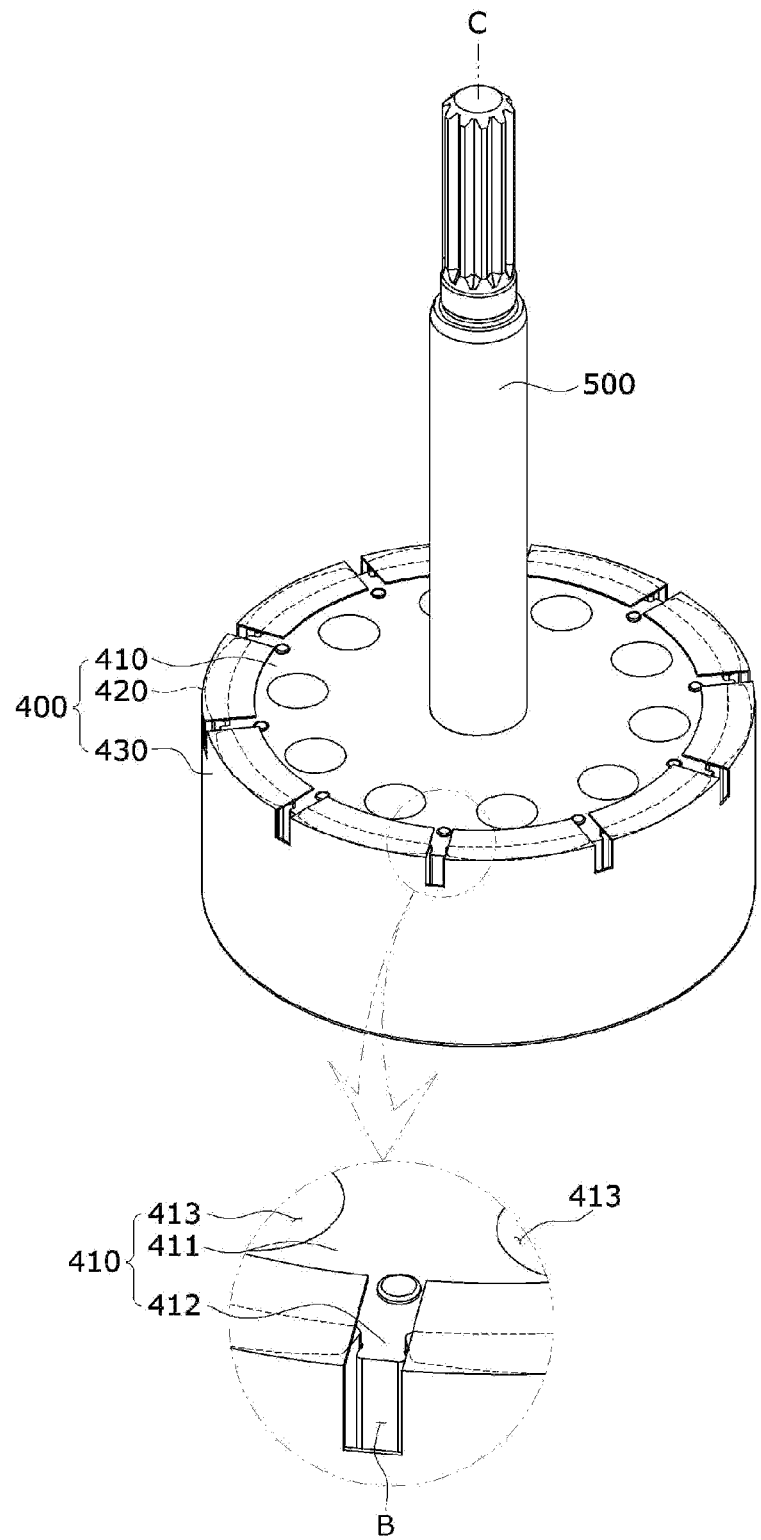
FIG. 2 is a perspective view illustrating a rotor and a shaft according to an embodiment.

FIG. 1 is a view illustrating a motor according to an embodiment, and FIG. 2 is a perspective view illustrating a rotor and a shaft according to the embodiment. In FIG. 1, an x direction may be a radial direction, and a y direction may be an axial direction. In addition, the axial direction and the radial direction may be perpendicular to each other. In this case, the axial direction may be a longitudinal direction of a shaft 500.

Referring to FIGS. 1 and 2, a motor 1 according to the embodiment may include a housing 100 having one side at which an opening is formed, a cover 200 disposed on the housing 100, a stator 300 disposed in the housing 100, a rotor 400 disposed inside the stator 300, and the shaft 500 coupled to the rotor 400. In this case, the term "inward" may refer to a direction toward a rotation center C of the motor 1 in the radial direction, and the term "outward" may refer to a direction opposite to "inward."

In addition, the motor 1 may include a busbar 600 disposed on the stator 300 and a sensor part 700 which detects ration of the rotor 400.

Figure 4:
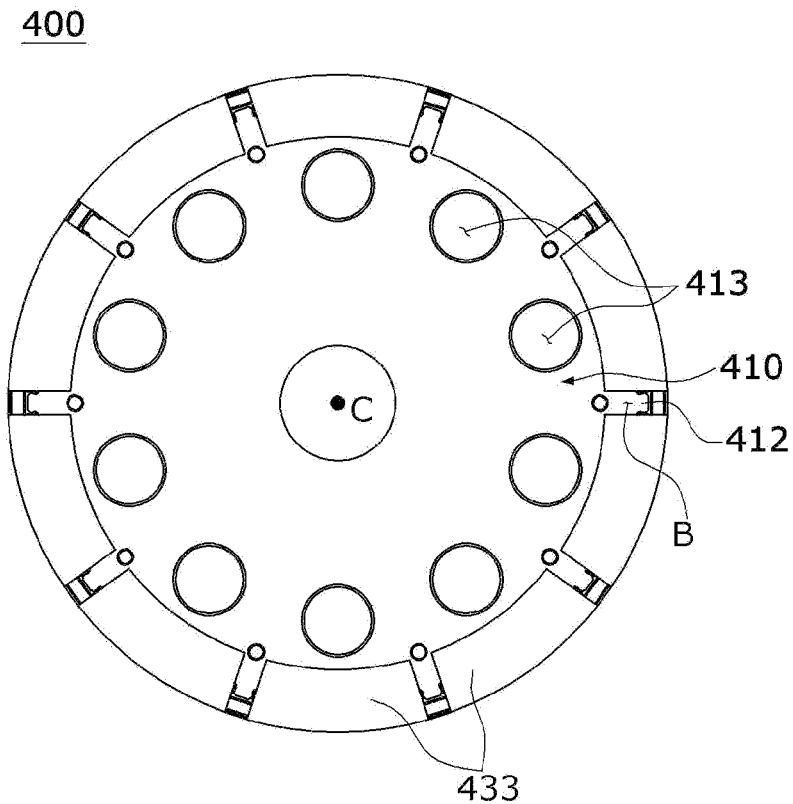
FIG. 4 is a plan view illustrating the rotor according to the embodiment.

As illustrated in FIG. 4, the rotor 400 coupled to the shaft 500 may be referred to as a shaft assembly. Accordingly, the shaft assembly may be provided as a single part for assembly of the motor 1.

The housing 100 and the cover 200 may form an exterior of the motor 1. In addition, the housing 100 and the cover 200 may be coupled to form an accommodation space. Accordingly, as illustrated in FIG. 2, the stator 300, the rotor 400, the shaft 500, the busbar 600, the sensor part 700, and the like may be disposed in the accommodation space.

In this case, the shaft 500 is rotatably disposed in the accommodation space. Accordingly, the motor 1 may further include bearings 10 disposed on upper and lower portions of shaft 500. In this case, the bearing 10 disposed in the housing 100 may be referred to as a first bearing or lower bearing, and the bearing 10 disposed in the cover 200 may be referred to as a second bearing or upper bearing.

The housing 100 may be formed in a cylindrical shape. In addition, the housing 100 may accommodate the stator 300, the rotor 400, and the like therein. In this case, a shape or material of the housing 100 may be variously changed. For example, the housing 100 may be formed of a metal material which firmly withstands even high temperatures.

The housing 100 may include a pocket part, in which the bearing 10 is accommodated, in a lower portion. In this case, the pocket part of the housing 100 may be referred to as a housing pocket part.

The cover 200 may be disposed on an open surface of the housing 100, that is, an upper portion of the housing 100, to cover the opening of the housing 100. In this case, a shape or material of the cover 200 may be variously changed. For example, the cover 200 may be formed of a metal material which firmly withstands even high temperatures.

In addition, the cover 200 may include a pocket part in which the bearing 10 is accommodated. In this case, the pocket part of the cover 200 may be referred to as a cover pocket part.

The stator 300 induces an electrical interaction with the rotor 400 to induce rotation of the rotor 400.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Referring to FIG. 1, the stator 300 may include a stator core 310, insulators 320 disposed on the stator core 310, and coils 330 wound around the insulators 320.

The coils 330 which generate a rotating magnetic field may be wound around the stator core 310. In this case, the stator core 310 may be formed as a single core or formed by coupling a plurality of divided cores.

The stator core 310 may be formed in a form in which a plurality of thin steel plates are stacked but is not necessarily limited thereto. For example, the stator core 310 may also be formed as one single part.

The stator core 310 may include a yoke having a cylindrical shape and a plurality of teeth protruding from the yoke in the radial direction.

The plurality of teeth may be disposed apart from each other in a circumferential direction of the yoke. Accordingly, slots in which the coils 330 are wound around the teeth may be formed between the teeth.

Meanwhile, the teeth of the stator 300 may be disposed to have an air gap between the teeth and the rotor 400. In this case, the air gap may be a distance between the teeth and magnets 420 in the radial direction.

The insulators 320 insulate the stator core 310 from the coils 330. Accordingly, the insulators 320 may be disposed between the stator core 310 and the coils 330.

Accordingly, the coils 330 may be wound around the stator core 310 on which the insulators 320 are disposed.

The rotor 400 rotates due to an electrical interaction with the stator 300. In this case, the rotor 400 may be rotatably disposed inside the stator 300.

Figure 3:
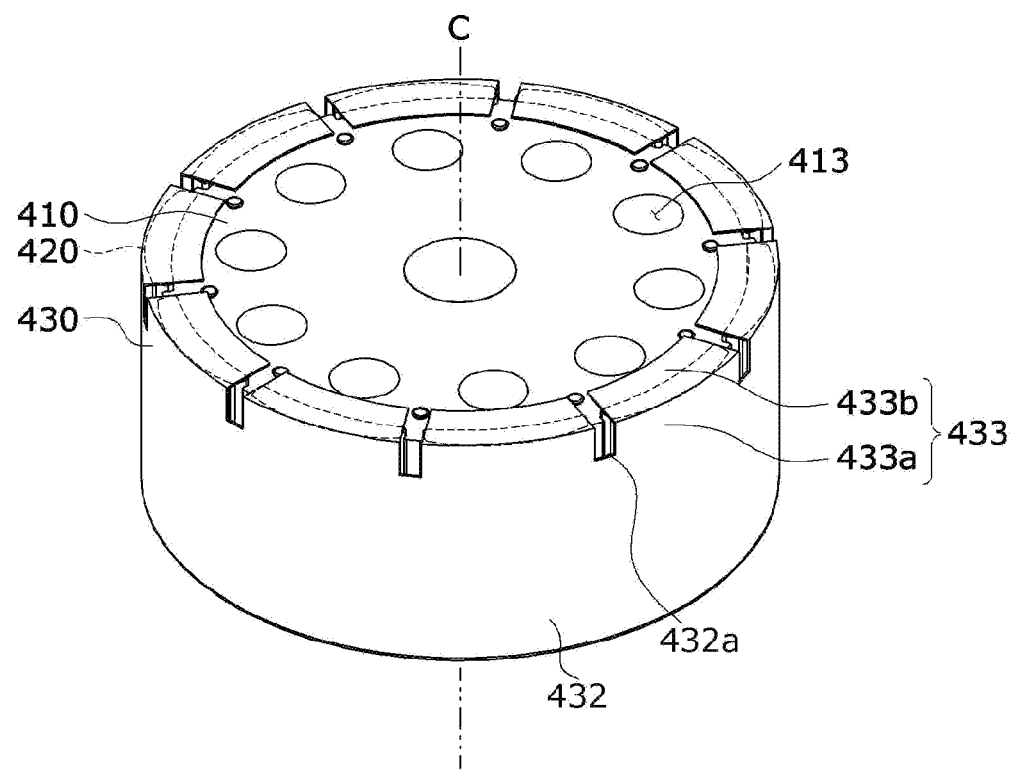
FIG. 3 is a perspective view illustrating the rotor according to the embodiment.
Figure 5:
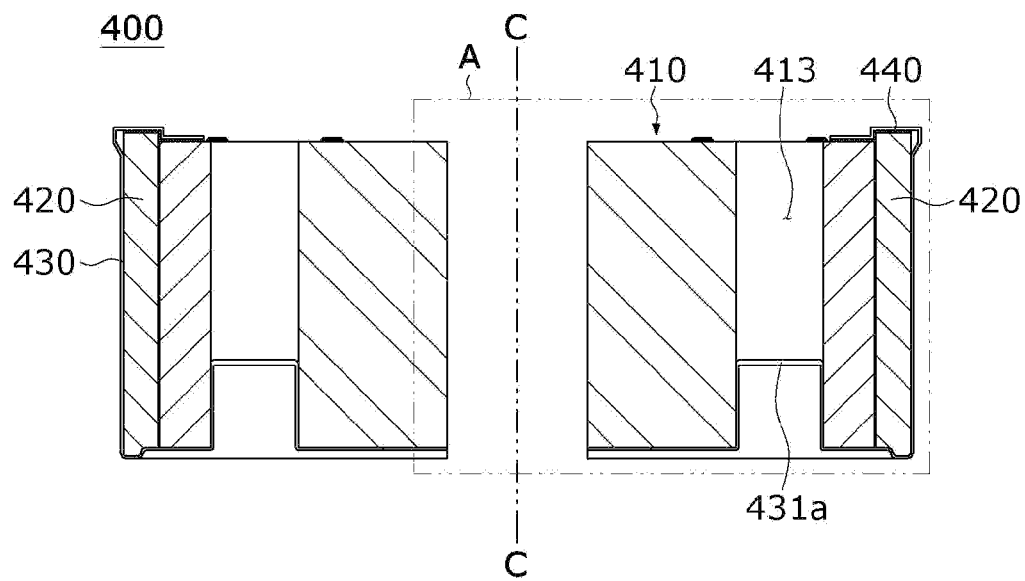
FIG. 5 is a cross-sectional view illustrating the rotor according to the embodiment.
Figure 6:
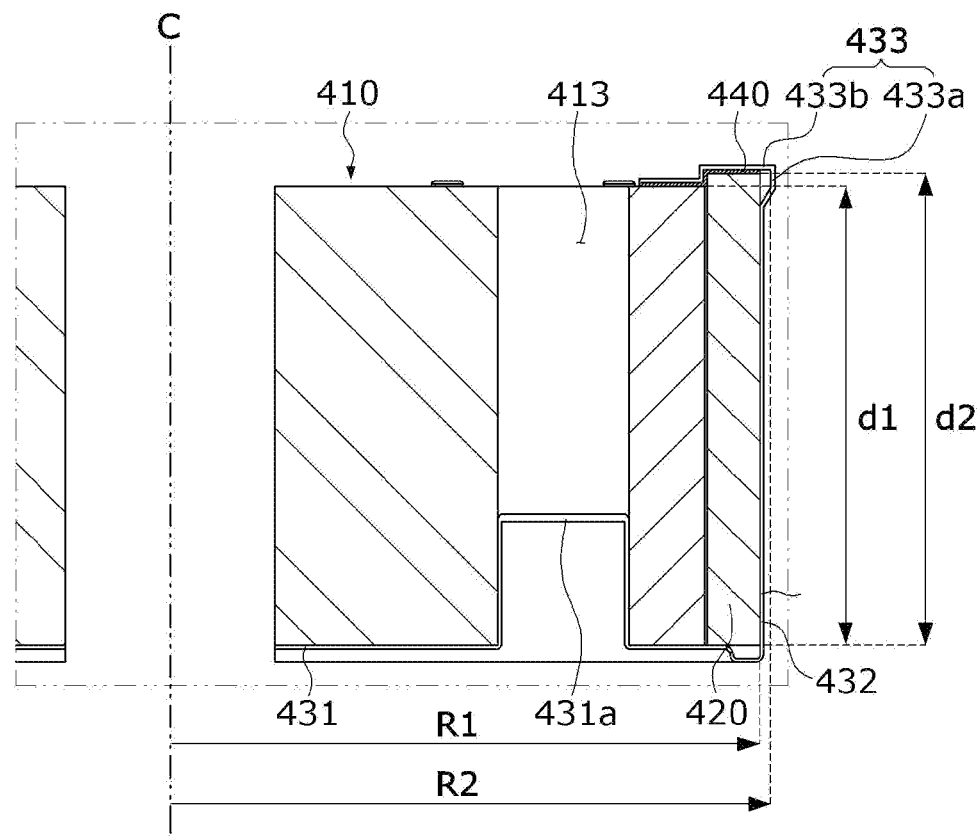
FIG. 6 is an enlarged view illustrating region A of FIG. 5.
Figure 7:
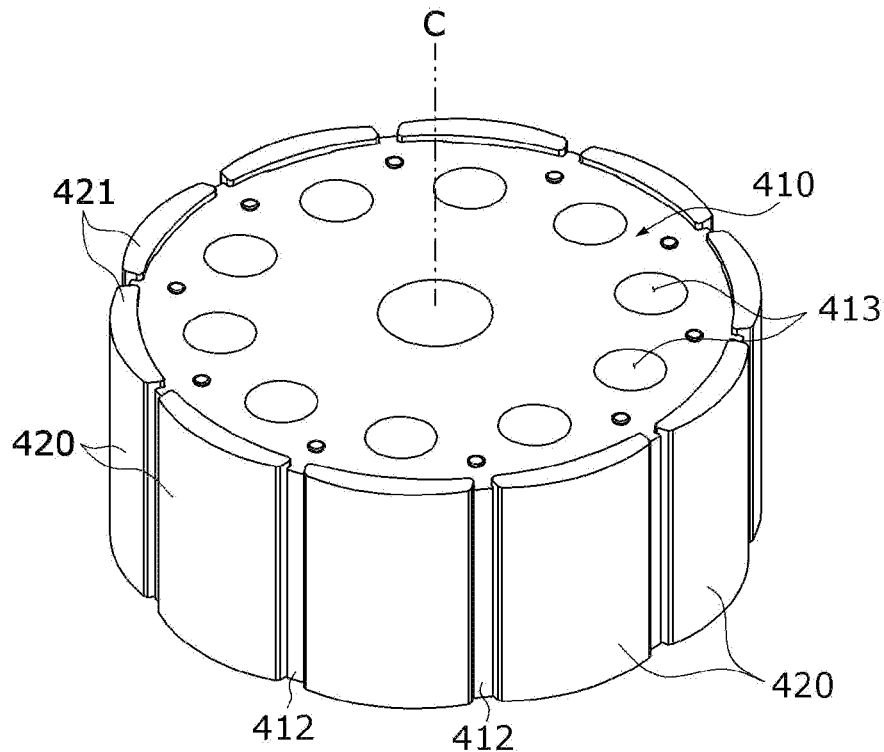
FIG. 7 is a perspective view illustrating an arrangement of a rotor core and magnets of the rotor according to the embodiment.
Figure 8:
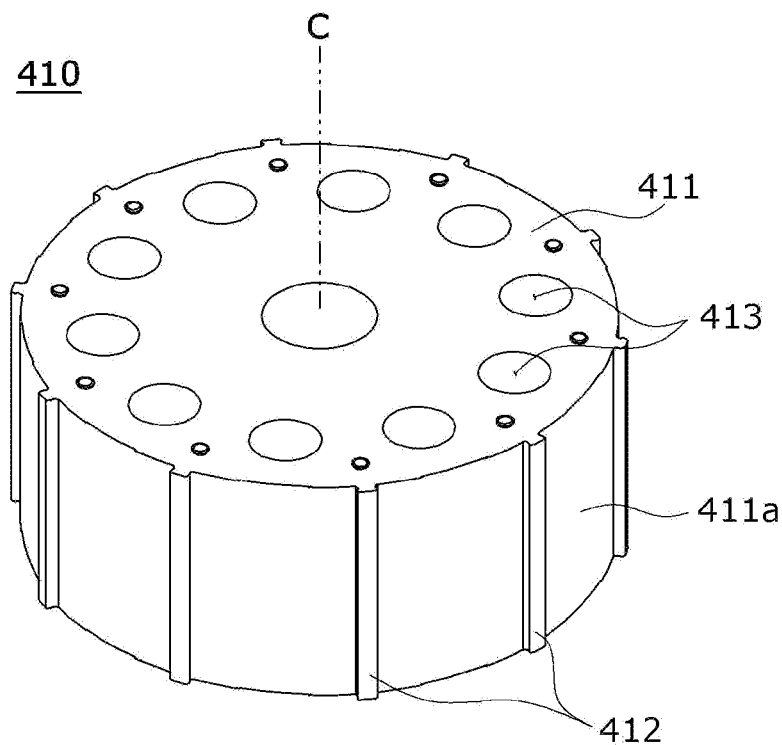
FIG. 8 is a view illustrating the rotor core of the rotor according to the embodiment.

FIG. 3 is a perspective view illustrating the rotor according to the embodiment, FIG. 4 is a plan view illustrating the rotor according to the embodiment, FIG. 5 is a cross-sectional view illustrating the rotor according to the embodiment, FIG. 6 is an enlarged view illustrating region A of FIG. 5, FIG. 7 is a perspective view illustrating an arrangement of a rotor core and the magnets of the rotor according to the embodiment, and FIG. 8 is a view illustrating the rotor core of the rotor according to the embodiment.

Referring to FIGS. 2 to 8, the rotor 400 may include a rotor core 410, the plurality of magnets 420 disposed on an outer side of the rotor core 410, and a can 430 disposed on the rotor core 410 coupled to the magnets 420. In this case, the magnets 420 may be disposed apart from each other at predetermined intervals on the rotor core 410 in the circumferential direction based on the center C. In this case, the rotor 400 may be a rotor according to a first embodiment.

The rotor core 410 may be formed in a form in which a plurality of thin steel plates are stacked or formed in one container form. In this case, the rotor core 410 may be formed to have a predetermined length d1 in the axial direction. In this case, the length d1 of the rotor core 410 in the axial direction may be referred to as a first length.

In addition, a hole to which the shaft 500 is coupled may be formed at a center C of the rotor core 410.

The rotor core 410 may include a rotor core body 411 having a cylindrical shape, a plurality of guides 412 protruding to extend outward from an outer circumferential surface 411a of the rotor core body 411, and holes 413 formed in the rotor core body 411. In this case, the holes 413 may be referred to as first holes.

The rotor core body 411 may be formed in a cylindrical shape, and a hole coupled to the shaft 500 may be formed at a center C of the rotor core body 411.

The guides 412 may be integrally formed with the rotor core body 411.

The guides 412 may guide an arrangement of the magnets 420. Accordingly, the magnets 420 may be disposed between the guides 412. In this case, the magnets 420 are supported by the guides 412 so that movement of the magnets 420 in the circumferential direction may be inhibited. In this case, the guides 412 may be formed on the outer circumferential surface 411a of the rotor core body 411 to extend in the axial direction The holes 413 may be formed in the rotor core body 411 to pass through the rotor core body 411 in the axial direction. In this case, the plurality of holes 413 may be formed to be spaced apart from each other in the circumferential direction.

In addition, the holes 413 may be coupled to protruding parts 431a of the can 430. Accordingly, the rotor core 410 may be disposed at a predetermined position of the can 430 due to coupling between the holes 413 and the protruding parts 431a. In this case, the can 430 may be disposed apart from the outer circumferential surface 411a of the rotor core body 411 in the radial direction in consideration of the arrangement of the magnets 420. That is, the rotor core 410 disposed in the can 430 may be disposed apart from the can 430 in the radial direction.

In this case, an example of the holes 413 passing through the rotor core body 411 for the coupling has been described, but the present invention is not necessarily limited thereto. For example, grooves may also be concavely formed in a lower surface of the rotor core body 411 in the axial direction instead of the holes 413.

Accordingly, when the rotor 400 is manufactured, a first assemble of the rotor core 410 and the can 430 may be performed by the coupling between the holes 413 and the protruding parts 431a. Accordingly, the rotor core 410 may be fixed to the can 430 by the coupling.

The magnets 420 generate a rotating magnetic field with the coils 330 wound around the stator core 310 of the stator 300.

Accordingly, due to an electrical interaction between the coils 330 and the magnets 420, the rotor 400 rotates, and the shaft 500 rotates in conjunction with the rotation of the rotor 400 so that a driving force of the motor 1 is generated.

The magnets 420 are disposed outside the rotor core 410 to implement a surface permanent magnet (SPM) type rotor.

The magnets 420 may be disposed between the outer circumferential surface 411a of the rotor core body 411 and the can 430. In addition, the magnets 420 may be disposed by the guides 412.

In a state in which the first assembly of the rotor core 410 and the can 430 are performed by coupling the holes 413 and the protruding parts 431a, since the magnets 420 are inserted between the rotor core 410 and the can 430, a conventional bonding process for fixing a rotor core and magnets can be removed. Accordingly, since a bonding process of the motor 1 is removed, a time for curing an adhesive member is reduced, and thus productivity of the motor 1 can be improved.

Meanwhile, each of the magnets 420 may be formed to have a predetermined length d2 in the axial direction. In this case, the length d2 of the magnet 420 in the axial direction may be referred to as a second length. In addition, the length d2 of the magnet 420 in the axial direction is greater than the length d1 of the rotor core 410 in the axial direction in consideration of a driving force and a size of the motor 1 in the axial direction.

The can 430 may protect the rotor core 410 and the magnets 420 from physical or chemical stimulus. In addition, the can 430 may inhibit the magnets 420 from being separated from the rotor core 410. In this case, the can 430 may be disposed to cover the magnets 420 disposed on the rotor core 410.

The can 430 may include a base 431, a body 432 extending from the base 431 in the axial direction, and a plurality of extension parts 433 extending from an end portion 432a of the body 432. In this case, the base 431, the body 432, and the plurality of extension parts 433 may be integrally formed.

The base 431 may be formed in a disc shape. In addition, the base 431 may include a hole formed in a central portion for an arrangement of the shaft 500.

In addition, the base 431 may be disposed in contact with the rotor core 410 and lower portions of the magnets 420 to support the rotor core 410 and the magnets 420.

In addition, the base 431 may include the protruding parts 431a protruding in the axial direction. In this case, the protruding parts 431a may be coupled to the holes 413 to guide coupling between the rotor core 410 and the can 430 and support the rotor core 410.

Meanwhile, an adhesive member such as glue may also be applied on an upper surface, which is an inner surface, of the base 431 to more firmly couple the rotor core 410 and the can 430. In addition, since the upper surface may be in contact with one sides of the magnets 420, the magnets 420 and the can 430 may also be more firmly coupled by the adhesive member. In this case, the upper surface may be a contact surface in contact with the rotor core 410 or the magnets 420.

The body 432 may be disposed to face an outer circumferential surface of the rotor core 410. In addition, an inner surface of the body 432 may be disposed in contact with the magnets 420.

The body 432 may be formed in a pipe shape. Accordingly, the body 432 may be disposed on a predetermined radius R1 based on a center C. In this case, the center C may be an axial center of the shaft 500. In addition, the radius R1 of the body 432 may be a distance from the axial center of the shaft 500 to the inner surface of the body 432. In addition, the radius R1 of the body 432 may be referred to as a first radius.

The extension parts 433 may extend from the end portion 432a of the body 432. In this case, the plurality of extension parts 433 may be disposed apart from each other on the end portion of the body 432 in the circumference direction. Accordingly, gaps may be formed between the extension parts 433, and portions cut to form the gaps may be referred to as blanks B. In this case, the gaps may denote separation distances between the extension parts 433.

Accordingly, the magnets 420 may be easily inserted into the extension parts 433 due to the blanks B.

As illustrated in FIG. 2, the blanks B may be disposed to overlap the guides 412 in the radial or axial direction. In this case, parts of upper sides of the guides 412 may be exposed from the can 430 due to the blanks B. In this case, the parts of the upper sides of the guides 412 may include parts of upper surfaces or outer surfaces of the guides 412. Accordingly, positions of the magnets 420 may be checked by checking positions of the guides 412 through the blanks B.

The extension parts 433 may be formed in a plate shape. Specifically, the extension parts 433 may include first regions 433a disposed apart from the magnets 420 in the radial direction and second regions 433b extending from one ends of the first regions.

In addition, the first regions 433a of the extension parts 433 may be disposed on a predetermined radius R2 based on the center C. Accordingly, the extension parts 433 may be formed to have a predetermined curvature. In this case, the radius R2 of the extension parts 433 may be an inner diameter which is a distance from the axial center of the shaft 500 to an inner surface of the extension part 433. Specifically, the radius R2 of the extension parts 433 may be a distance from the axial center of the shaft 500 to inner surfaces of the first regions 433a of the extension parts 433. In addition, the radius R2 of the extension parts 433 may be referred to as a second radius.

In addition, the radius R2 of the extension parts 433 based on the center C in the radial direction may be greater than the radius R1 of the body 432 in consideration of assembly automation of the magnets 420.

Meanwhile, upper ends of the extension parts 433 are bent to cover parts of upper surfaces 421 of the magnets 420 and a part of an upper surface of the rotor core 410. In this case, the extension parts 433 may be disposed to cover an entirety of the upper surfaces 421 of the magnets 420 but are not necessarily limited thereto. For example, the extension parts 433 may be disposed to cover the parts of the upper surfaces 421 of the magnets 420, but the extension parts 433 may be disposed to cover the entirety of the upper surfaces 421 from a viewpoint of protection of the magnets 420.

In addition, lower ends of the first regions 433a which are lower ends of the extension parts 433 may be disposed at a lower level than the upper surfaces 421 of the magnets 420 in consideration of assemblability of the magnets 420 due to an elastic force of the extension parts 433. Alternatively, the end portion 432a of the body 432 may be disposed at a lower level than the upper surfaces 421 of the magnets 420.

Accordingly, lower portions of the blanks B may be disposed at a lower level than the upper surfaces 421 of the magnets 420. However, the lower portions of the blanks B may be disposed at the level which is about 1 to 2 mm lower than the level of the upper surfaces 421 of the magnets 420 in consideration of assemblability through insertion of the magnets 420.

Alternatively, from a viewpoint of protection of the magnets 420 by minimizing exposure of the magnets 420 to the outside, the lower ends of the extension parts 433 which are the lower ends of the first regions 433a may be disposed at the same level as the upper surfaces 421 of the magnets 420.

Alternatively, the end portion 432a of the body 432 may be disposed at the same level as the upper surfaces 421 of the magnets 420.

Meanwhile, since the length d2 of each of the magnets 420 in the axial direction may be greater than the length d1 of the rotor core 410 in the axial direction, end portions of the bent extension parts 433 may be in contact with the upper surface of the rotor core 410 through caulking. As illustrated in FIG. 6, the second regions 433b may be bent through the caulking performed on the second regions 433b to form steps. Accordingly, parts of end portions of the second regions 433b may be in contact with the upper surface of the rotor core 410. In this case, the upper surface of the rotor core 410 may be an upper surface of the rotor core body 411. Accordingly, a fixing force of the can 430 toward the magnets 420 can be further improved.

In addition, the rotor 400 may further include an adhesive member 440 disposed between the upper surfaces 421 of the magnets 420 and the extension parts 433.

The adhesive member 440 may further improve coupling between the can 430 and the magnets 420. Accordingly, separation of the magnets 420 can be inhibited.

In addition, the adhesive member 440 may also be disposed between the upper surface of the rotor core 410 and the extension parts 433. Accordingly, a coupling force between the can 430 disposed to cover the magnets 420 and the rotor core 410 can be further improved. Accordingly, due to the coupling between the holes 413 of the rotor core 410 and the protruding parts 431a of the can 430, the caulking, and the coupling between the rotor core 410 and the extension part 433 by the adhesive member 440, separation between the rotor core 410 and the magnets 420 disposed on the can 430 can be inhibited.

Figure 9:
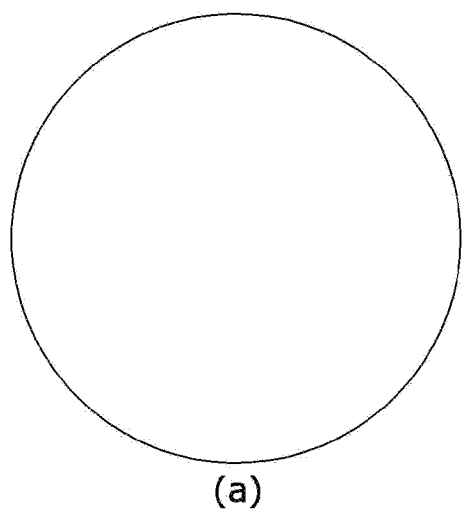
FIG. 9 is a set of views illustrating a process of manufacturing a can of the rotor according to the embodiment.
Figure 9:
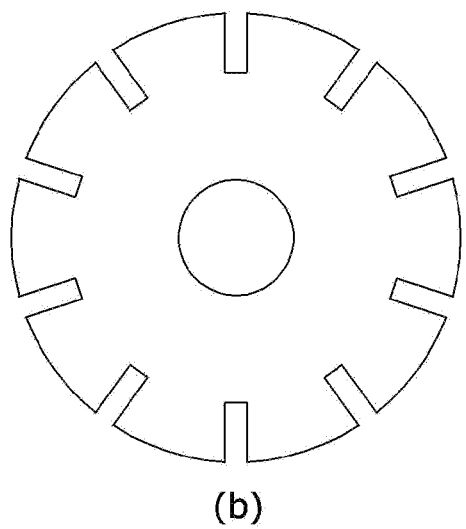
Figure 9:
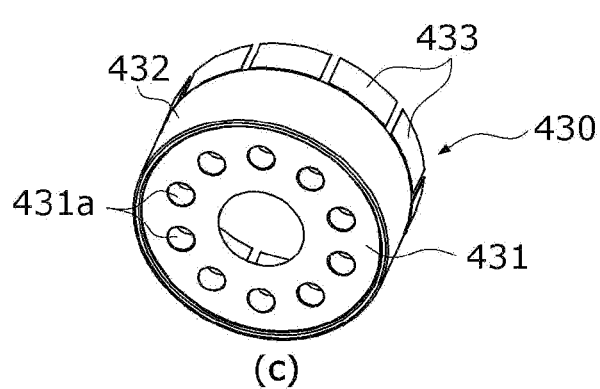

FIG. 9 is a set of views illustrating a process of manufacturing the can of the rotor according to the embodiment. In this case, FIG. 9A is a view illustrating a material for manufacturing the can, FIG. 9B is a view illustrating the material in which the blanks are formed, and FIG. 9C is a view illustrating the can formed by molding the material in which the blanks are formed.

As illustrated in FIG. 9B, the plurality of blanks B may be formed by forming blanks in the material having a disc shape illustrated in FIG. 9A. In this case, a hole may be formed in a central portion of the material for the arrangement of the shaft 500. In this case, the blanks B may be formed at predetermined intervals at an edge of the material in the circumferential direction. Accordingly, the extension parts 433 may be formed.

In addition, as illustrated in FIG. 9C, the can 430 may be formed by performing a drawing process and a punching process on the material in which the blanks B are formed. For example, the can 430 having a basket shape may be formed through the drawing process. In this case, the can 430 having two steps may be formed so that radii of the body 432 and the extension parts 433 of the can 430 are different based on the center C. In addition, the protruding parts 431a of the can 430 may be formed through the punching process.

The processes of FIGS. 9A to 9C may be automated and sequentially performed by a separate apparatus (not shown).

Figure 10A:
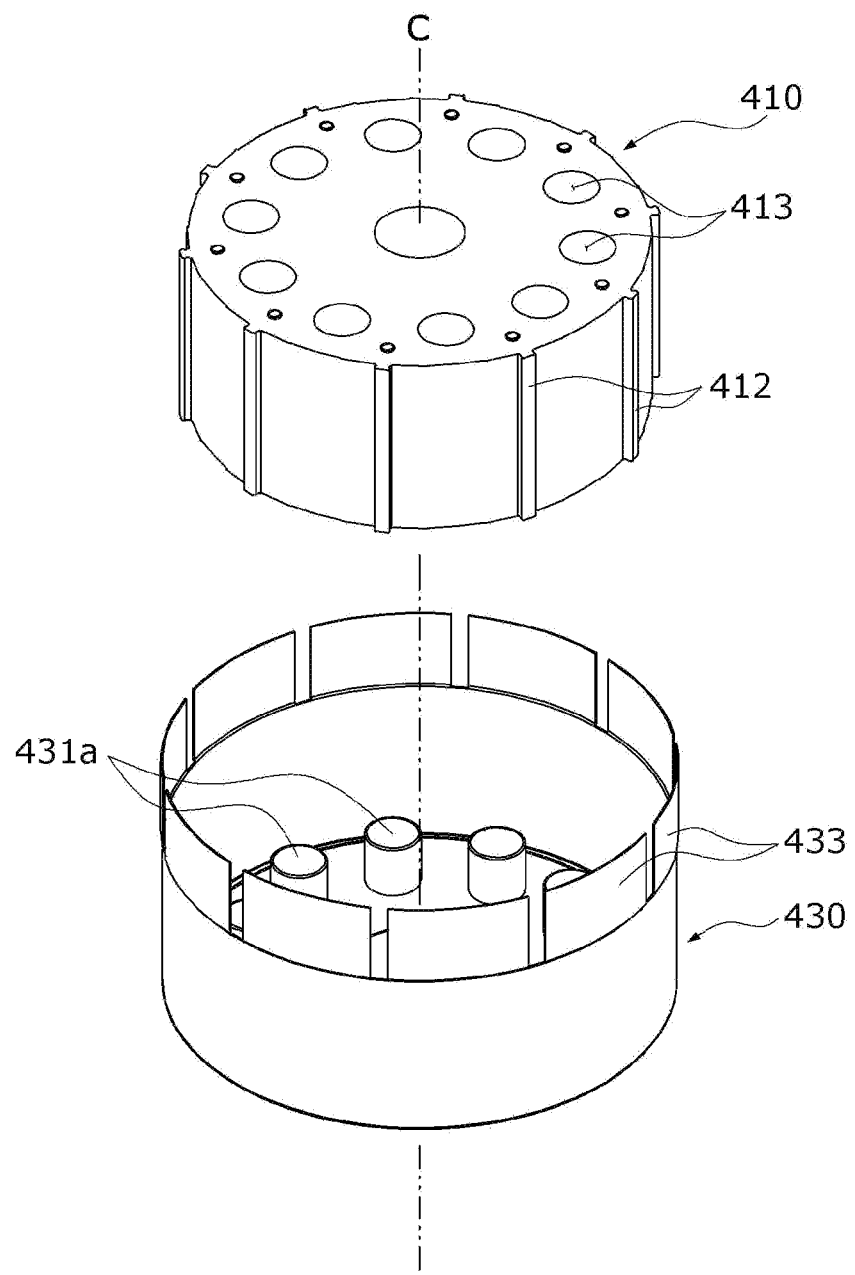
FIG. 10A is an exploded perspective view illustrating coupling between holes of the rotor core and protruding parts of the can.
Figure 10B:
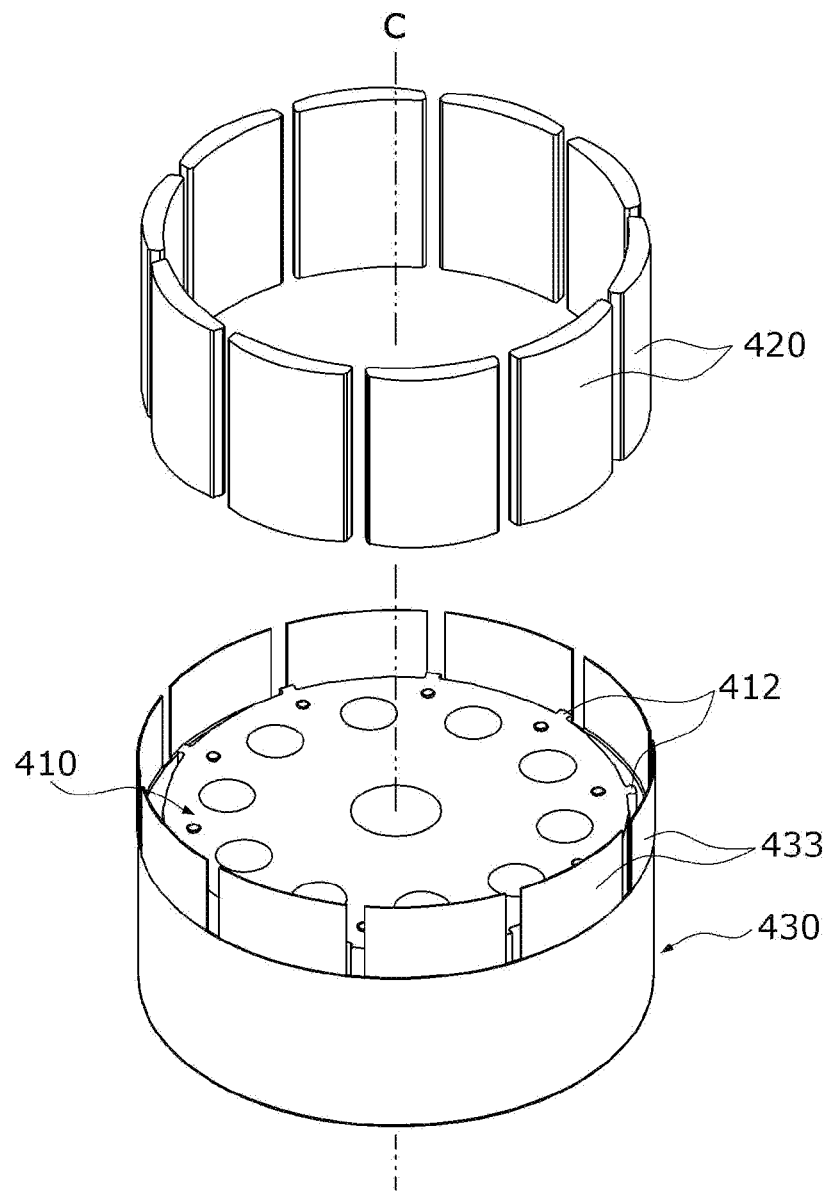
FIG. 10B is an exploded perspective view illustrating coupling of magnets in a state in which the rotor core and the can are coupled.
Figure 10C:
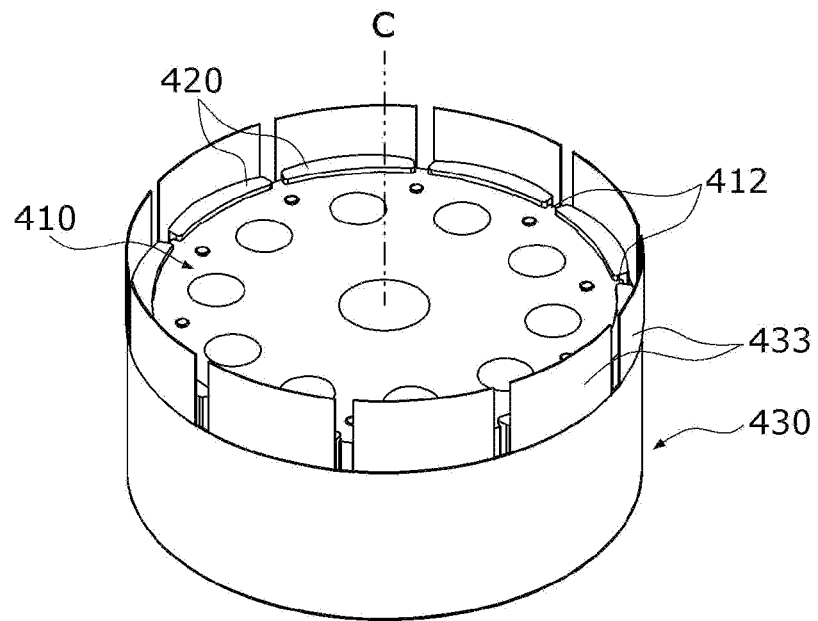
FIG. 10C is a coupling perspective view illustrating the coupling of the magnets in the state in which the rotor core and the can are coupled.
Figure 10D:
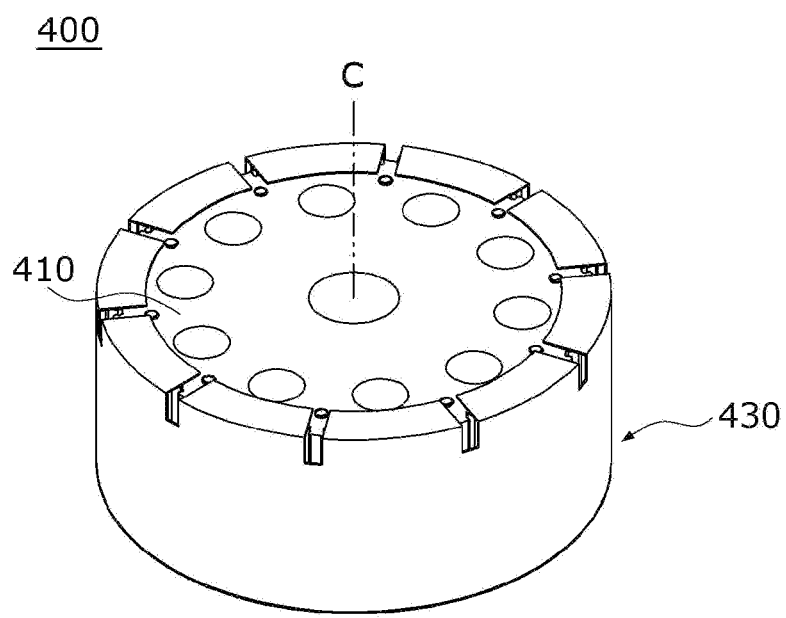
FIG. 10D is a view illustrating a process of bending extension parts of the can.

FIG. 10 shows views illustrating a process of manufacturing the rotor according to the embodiment, wherein FIG. 10A is an exploded perspective view illustrating coupling between holes of the rotor core and the protruding parts of the can, FIG. 10B is an exploded perspective view illustrating coupling of the magnets in a state in which the rotor core and the can are coupled, FIG. 10C is a coupling perspective view illustrating the coupling of the magnets in the state in which the rotor core and the can are coupled, and FIG. 10D is a view illustrating a process of bending extension parts of the can.

Referring to FIG. 10A, the rotor core 410 may be disposed in the can 430. In this case, since the holes 413 of the rotor core 410 and the protruding parts 431a of the can 430 are coupled, the rotor core 410 may be positioned at a preset position, and movement of the rotor core 410 may be inhibited by the coupling. In this case, the outer circumferential surface 411a of the rotor core 410 may be disposed apart from an inner circumferential surface of the can 430 in the radial direction to form a space into which the magnets 420 are inserted.

Referring to FIGS. 10B and 10C, the magnets 420 may be inserted into and disposed in the space formed between the rotor core 410 and the can 430. In this case, the magnets 420 may be guided by the guides 412 of the rotor core 410. In this case, since the radius of the extension parts 433 may be formed to be greater than the radius of the body 432 of the can 430 based on the center C, the magnets 420 may be inserted into the space without interference with the extension parts 433.

Referring to FIGS. 10C and 10D, the extension parts 433 of the can 430 may be bent inward. Accordingly, the extension parts 433 may cover a part of an upper side of the rotor core 410 and the upper surfaces 421 of the magnets 420.

In this case, the extension parts 433 and the upper surfaces 421 of the magnets 420 may be firmly coupled by arranging the adhesive member 440 therebetween. In addition, the length d2 of the magnet 420 in the axial direction is formed to be greater than the length d1 of the rotor core 410 in the axial direction, and the caulking process is performed on the end portions of the bent extension parts 433 so that the upper surface of the rotor core 410 may be in contact with the extension parts 433. Accordingly, a coupling force between the magnets 420 and the can 430 may further improved. In this case, the coupling force can be further improved by arranging the adhesive member 440 between the upper surface of the rotor core 410 and the extension parts 433.

A bonding process which has been applied to the motor 1 may be removed using the processes of FIGS. 10A to 10D.

In addition, the processes of FIGS. 10A to 10D may be automated and sequentially performed using a separate apparatus (not shown).

Accordingly, the productivity of the rotor 400 and the motor including the same can be improved through the processes described above.

The shaft 500 may be disposed in the housing 100 to be rotatable by the bearing 10. In addition, the shaft 500 may rotate in conjunction with rotation of the rotor 400.

In addition, the shaft 500 may be coupled to the hole formed in a central portion of the rotor core 410 in a press-fit manner.

The busbar 600 may be disposed on the stator 300.

In addition, the busbar 600 may be electrically connected to the coils 330 of the stator 300.

The busbar 600 may include a busbar body (not shown) and a plurality of terminals disposed in the busbar body. In this case, the busbar body may be a molded part formed in an injection molding manner. In addition, each of the terminals may be electrically connected to the coils 330 of the stator 300.

The sensor part 700 may detect a position of the rotor 400 by detecting a magnetic force of sensing magnets installed to operate in conjunction with rotation of the rotor 400 to detect rotation of the shaft 500.

The sensor part 700 may include a sensing magnet assembly 710 and a printed circuit board (PCB) 720.

The sensing magnet assembly 710 is coupled to the shaft 500 to operate in conjunction with the rotor 400 to detect a position of the rotor 400. In this case, the sensing magnet assembly 710 may include the sensing magnets and a sensing plate.

The sensing magnets may include main magnets disposed adjacent to a hole forming an inner circumferential surface thereof in the circumferential direction and sub-magnets formed at an edge thereof.

The main magnets may be arranged in the same way as the drive magnets inserted into the rotor 400 of the motor.

The sub-magnets may be divided further than the main magnets so that the sub-magnets have poles of which the number is greater than the number of poles of the main magnets. Accordingly, a rotation angle may be divided and measured more precisely due to the sub-magnets, and thus the motor may be driven more smoothly.

The sensing plate may be formed of a disc type metal material. The sensing magnets may be coupled to an upper surface of the sensing plate. In addition, the sensing plate may be coupled to the shaft 500. In this case, a hole through which the shaft 500 passes may be formed in the sensing plate.

A sensor which detects a magnetic force of the sensing magnets may be disposed on the PCB 720. In this case, the sensor may be provided as a Hall integrated circuit (IC). In addition, the sensor may detect changes in an N-pole and an S-pole of the sensing magnets and generate a sensing signal. Accordingly, the PCB 720 on which the Hall IC is disposed may be referred to as a sensing assembly or position detection device.

Referring to FIG. 1, a motor 1 according to an embodiment may include a housing 100 having one side at which an opening is formed, a cover 200 disposed on the housing 100, a stator 300 disposed in the housing 100, a rotor 1400 disposed inside the stator 300, a shaft 500 which rotates with the rotor 1400, a busbar 600 disposed on the stator 300, and a sensor part 700 which detects rotation of the shaft 500. In this case, the rotor 1400 may be a rotor according to a second embodiment.

Hereinafter, when the motor 1 to which the rotor 1400 according to the second embodiment is applied, since components, which are the same as those of the motor 1 to which the rotor 400 according to the first embodiment is applied, are assigned with the same symbols, the detailed descriptions thereof will be omitted.

The rotor 1400 rotates due to an electrical interaction with the stator 300. The rotor 400 may be rotatably disposed inside the stator 300. In addition, the shaft 500 may be coupled to a central portion thereof.

Figure 11:
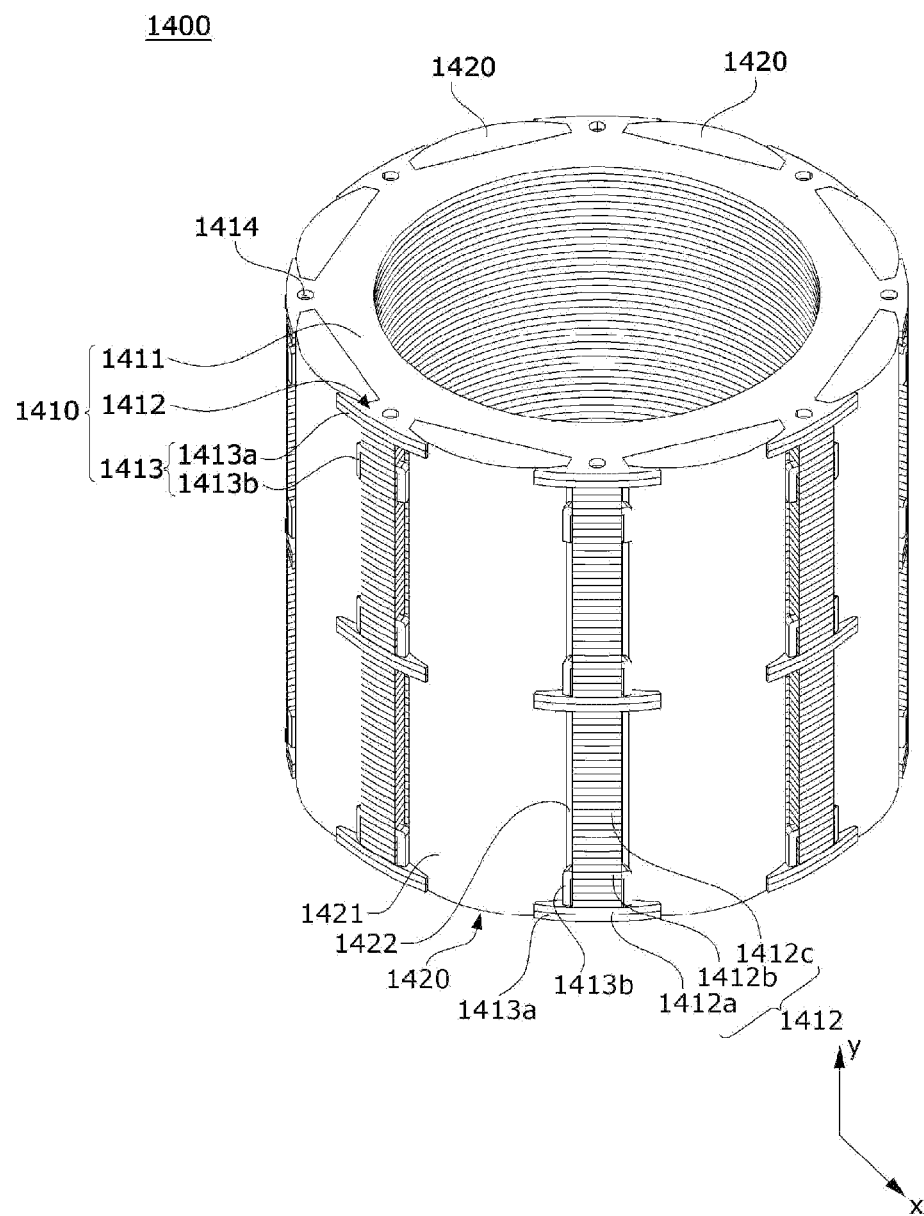
FIG. 11 is a perspective view illustrating another example of a rotor of the motor according to the embodiment.
Figure 12:
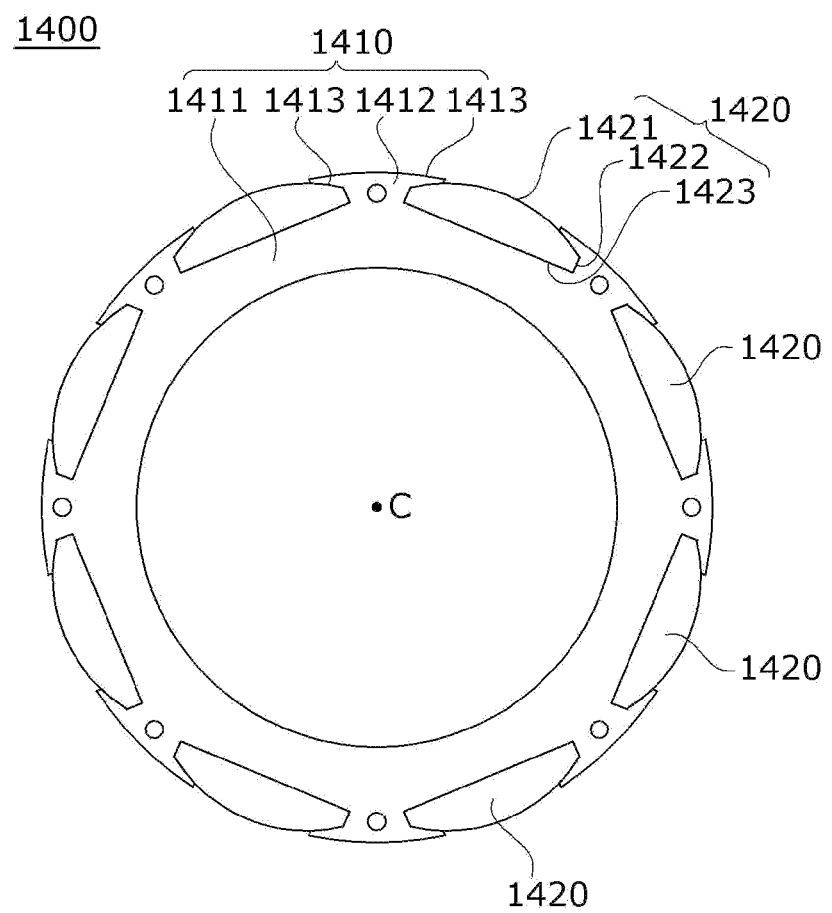
FIG. 12 is a front view illustrating another example of the rotor of the motor according to the embodiment.
Figure 13:
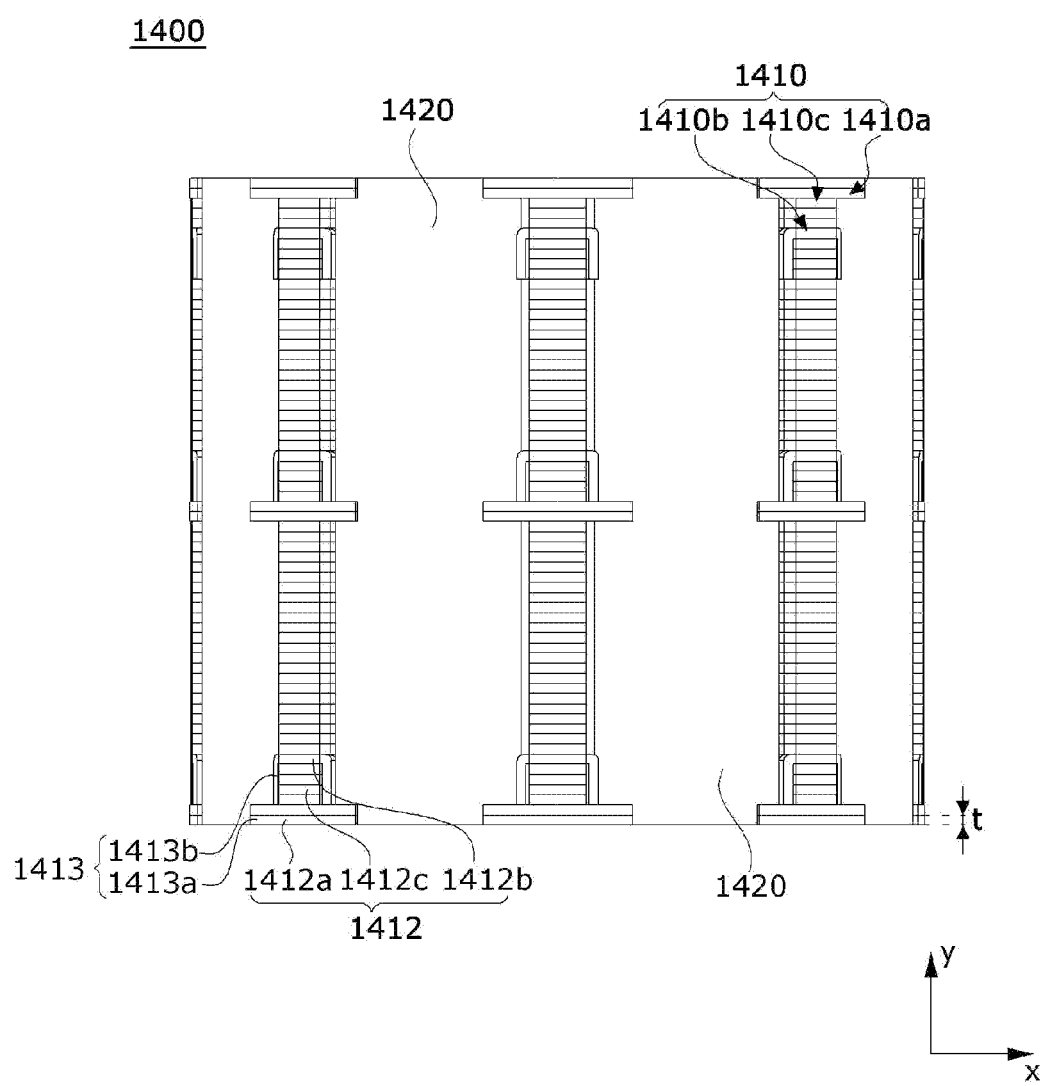
FIG. 13 is a plan view illustrating another example of the rotor of the motor according to the embodiment.
Figure 14:
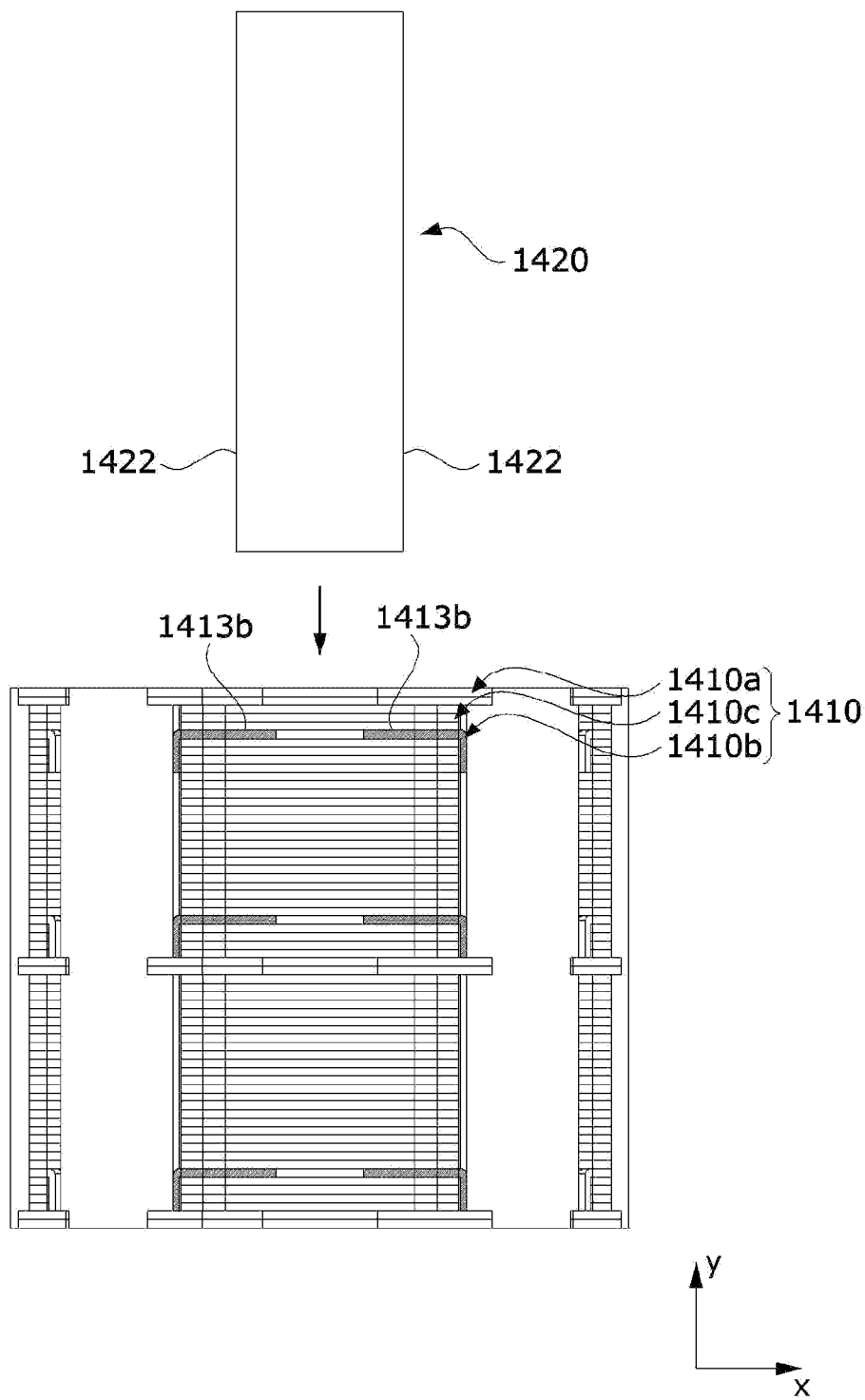
FIG. 14 is a view illustrating a coupling relationship between a rotor core and a magnet of another example of the rotor disposed in the motor according to the embodiment.
Figure 15:
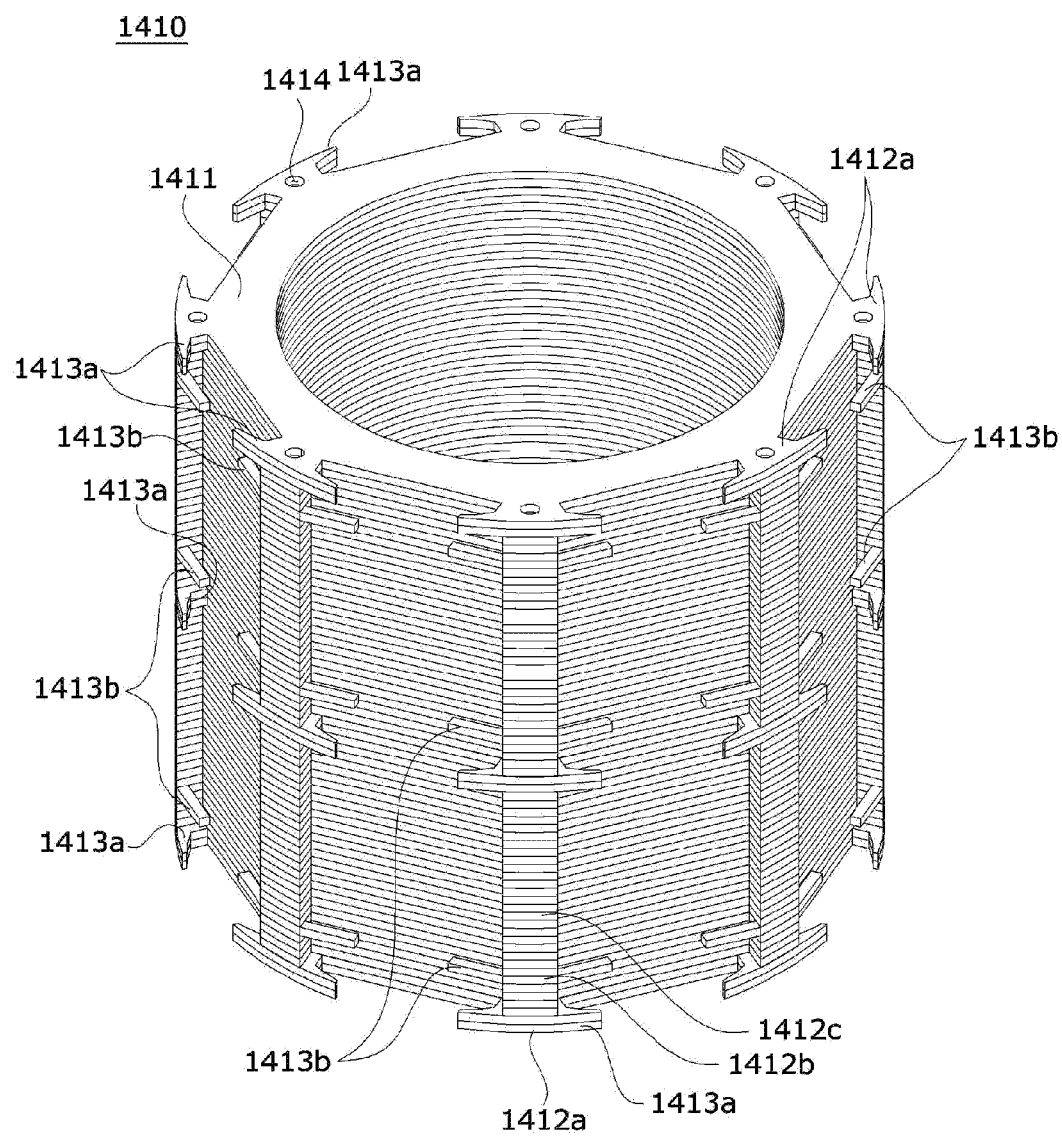
FIG. 15 is a perspective view illustrating the rotor core of another example of the rotor disposed in the motor according to the embodiment.
Figure 16:
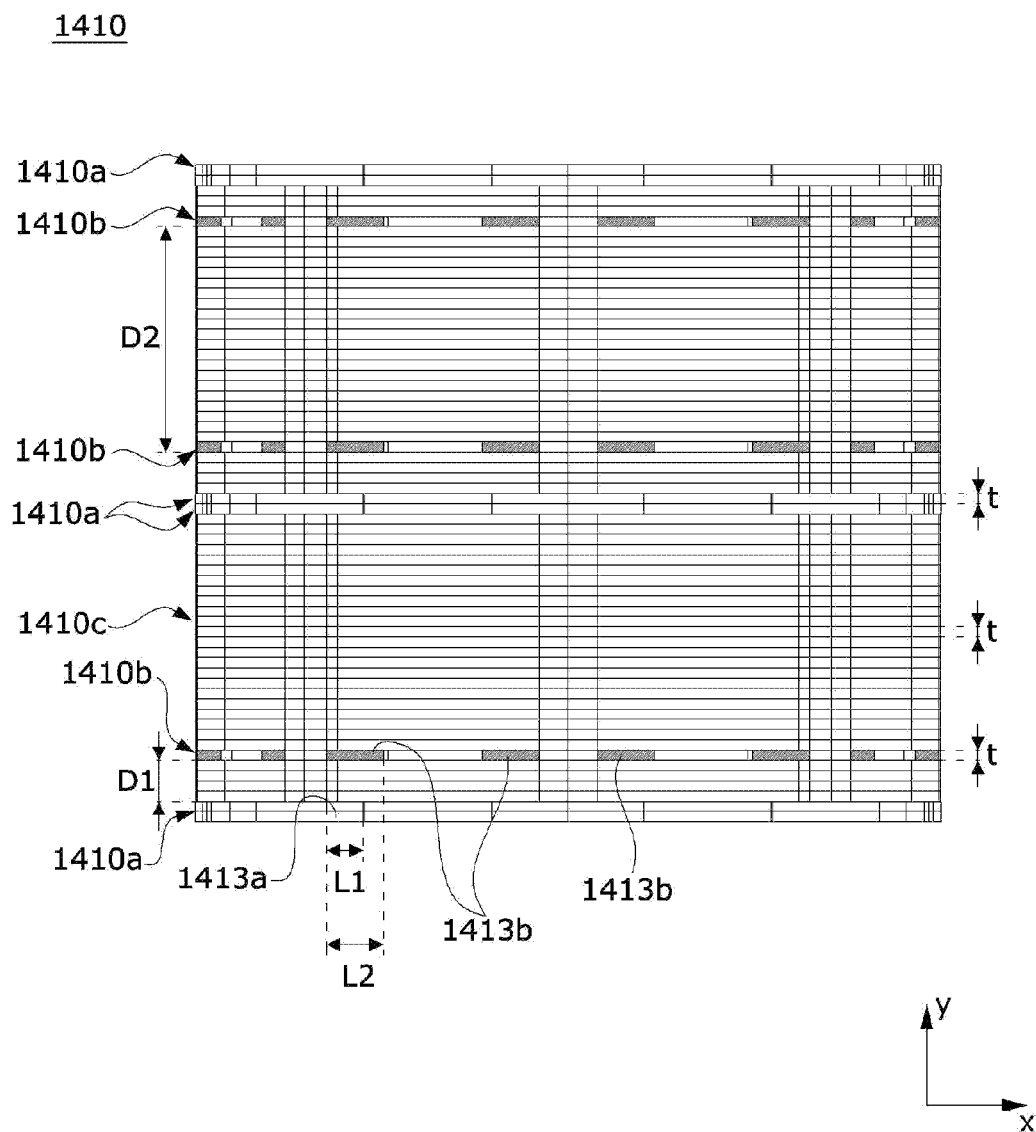
FIG. 16 is a front view illustrating the rotor core of another example of the rotor disposed in the motor according to the embodiment.
Figure 17:
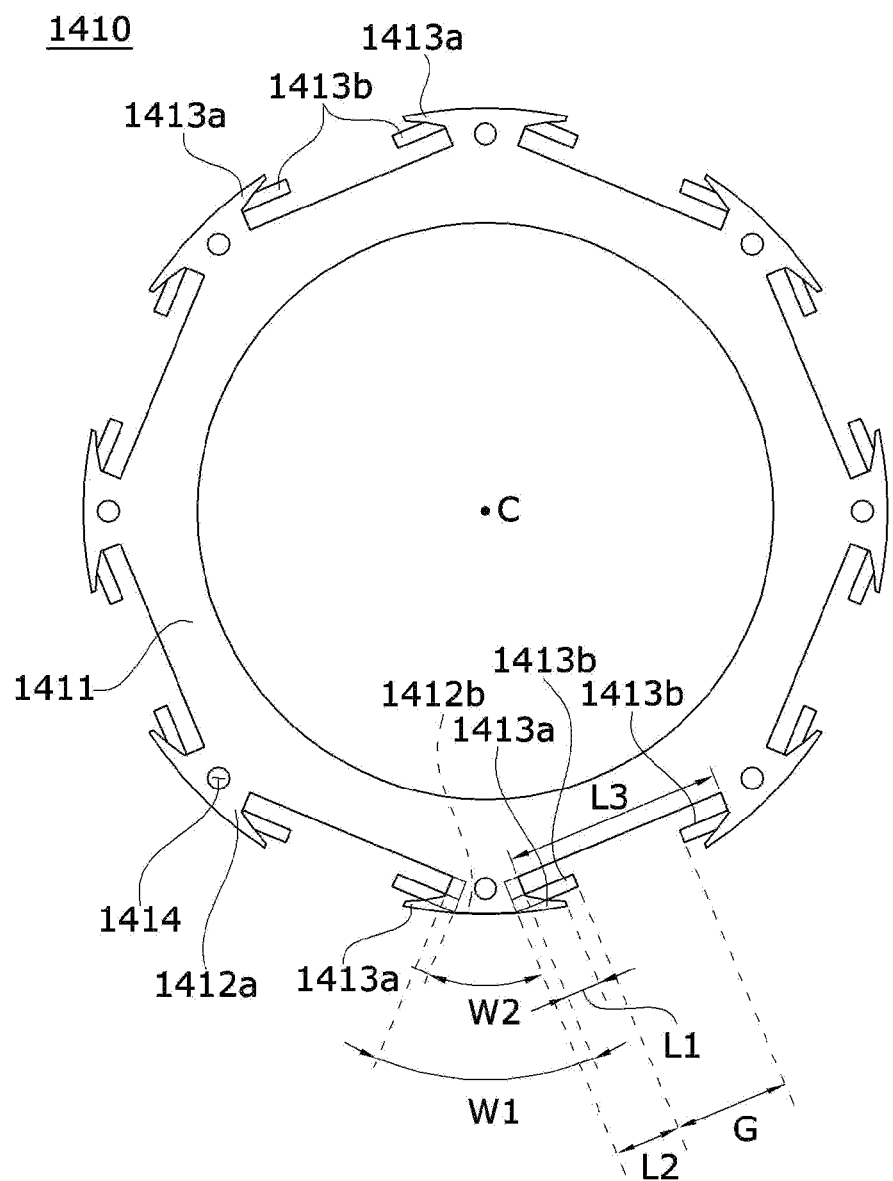
FIG. 17 is a plan view illustrating the rotor core of another example of the rotor disposed in the motor according to the embodiment.

FIG. 11 is a perspective view illustrating another example of the rotor of the motor according to the embodiment, FIG. 12 is a front view illustrating another example of the rotor of the motor according to the embodiment, FIG. 13 is a plan view illustrating another example of the rotor of the motor according to the embodiment, FIG. 14 is a view illustrating a coupling relationship between a rotor core and a magnet of another example of the rotor disposed in the motor according to the embodiment, FIG. 15 is a perspective view illustrating the rotor core of another example of the rotor disposed in the motor according to the embodiment, FIG. 16 is a front view illustrating the rotor core of another example of the rotor disposed in the motor according to the embodiment, and FIG. 17 is a plan view illustrating the rotor core of another example of the rotor disposed in the motor according to the embodiment.

The rotor 1400 may be formed by coupling a rotor core 1410 and magnets 1420.

Referring to FIGS. 11 to 14, the rotor 1400 may be formed as a surface permanent magnet (SPM) type rotor in which the magnets 1420 are disposed outside the rotor core 1410. In this case, the magnets 1420 may be disposed outside the rotor core 1410 due to protruding parts 1412 and protrusions 1413 without using an adhesive. In this case, the protruding parts 1412 may be referred to as guides or rotor core protruding parts, and the protrusions 1413 may be referred to as guide protrusions or rotor core protrusions.

The rotor core 1410 of the rotor 1400 may be manufactured by coupling a plurality of divided cores or manufactured as a single core including one container. Alternatively, the rotor core 1410 may be formed in a form in which a plurality of plates having a thin plate shape are stacked. In this case, the plates may be steel plates.

The rotor core 1410 may include a body 1411, the protruding parts 1412 formed to protrude from the body 1411 in a radial direction, and the protrusions 1413 formed to protrude from the protruding parts 1412 in a circumferential direction. In addition, the body 1411 may be referred to as a rotor core body.

In this case, the protruding parts 1412 may include first protruding parts 1412a, second protruding parts 1412b, and third protruding parts 1412c. In addition, the protrusions 1413 may include first protrusions 1413a protruding from the first protruding parts 1412a in the circumferential direction and second protrusions 1413b protruding from the second protruding parts 1412b in the circumferential direction.

In this case, parts of the second protrusions 1413b are disposed to overlap the first protruding parts 1412a in an axial direction, and the remaining parts may be disposed to be exposed (see FIG. 17).

Accordingly, when the magnets 1420 are inserted into the rotor core 1410, the magnets 1420 are guided by and inserted between the first protruding parts 1412a and the first protrusions 1413a of the rotor core 1410 in the axial direction, and end portions of the second protrusions 1413b may be bent by the magnets 1420 in the axial direction (an insertion direction of the magnets 1420).

In addition, inner surfaces of the first protrusions 1413a may be disposed in contact with first surfaces 1421 disposed on outer sides of the magnets 1420, and the second protrusions 1413b may be disposed in contact with second surfaces 1422 of the magnets 1420 in the circumferential direction. Accordingly, the magnets 1420 may be inhibited from being separated from the rotor core 1410 by the first protrusions 1413a and the second protrusions 1413b. In this case, the first surfaces 1421 may be referred to as outer surfaces of the magnets 1420. In addition, the second surfaces 1422 may be referred to as side surfaces of the magnets 1420.

Accordingly, when the motor 1 is driven, the first protrusions 1413a and the second protrusions 1413b may inhibit the magnets 1420 from being separated from the rotor core 1410.

The body 1411 may include a hole formed in a central portion to be coupled to the shaft and an outer surface in contact with the magnets 1420.

The protruding parts 1412 may be formed to protrude from the outer surface of the body 1411 in the radial direction. In addition, the plurality of protruding parts 1412 may be formed to be spaced apart from each other in the circumferential direction. Accordingly, the magnets 1420 may be disposed between the protruding parts 1412 in the circumferential direction, and the protruding parts 1412 may support the magnets 1420 to inhibit movement of the magnets 1420 in the circumferential direction.

The protruding parts 1412 may include the first protruding parts 1412a, the second protruding parts 1412b, and the third protruding parts 1412c which are disposed to overlap in the axial direction.

Referring to FIG. 17, each of the first protruding parts 1412a may be formed to have a predetermined width W1 in the circumferential direction.

In addition, the plurality of first protruding parts 1412a may be disposed apart from each other in the circumferential direction. Accordingly, the magnets 1420 may be disposed between the first protruding parts 1412a.

In addition, the plurality of first protruding parts 1412a may be disposed apart from each other in the axial direction. For example, the first protruding parts 1412a may be disposed at an uppermost end or lowermost end of the body 1411 and guide the magnets 1420 so that the magnets 1420 may be positioned at preset positions when the magnets 1420 are inserted into the rotor core 1410. That is, along with the first protrusions 1413a, the first protruding parts 1412a may be used as position determination parts which determine insertion positions of the magnets 1420.

Referring to FIG. 17, each of the second protruding parts 1412b may be formed to have a predetermined width W2 in the circumferential direction. In addition, the width W2 of the second protruding part 1412b in the circumferential direction may be smaller than the width W1 of the first protruding part 1412a in the circumferential direction. That is, the width W1 of the first protruding part 1412a in the circumferential direction may be greater than the width W2 of the second protruding part 1412b in the circumferential direction.

Accordingly, parts of the second protrusions 1413b protruding from the second protruding parts 1412b in the circumferential direction may be disposed to overlap the first protruding parts 1412a in the axial direction. Accordingly, even when one sides the magnets 1420 are inserted while in contact with the first protruding parts 1412a, the second protrusions 1413b may be easily bent.

In addition, since the second protrusions 1413b are in contact with the second surfaces 1422 of the magnets 1420 while bent, the second protruding parts 1412b may be disposed apart from the second surfaces 1422 of the magnets 1420 in the circumferential direction due to the second protrusions 1413b. Accordingly, predetermined gaps may be formed between the second protruding parts 1412b and the second surfaces 1422 of the magnets 1420.

The third protruding parts 1412c may be disposed between the first protruding parts 1412a and the second protruding parts 1412b in the axial direction, or between the second protruding parts 1412b disposed apart from each other in the axial direction.

In addition, the third protruding parts 1412c may be formed in the same shape as the second protruding parts 1412b. Specifically, a width of each of the third protruding parts 1412c in the circumferential direction may be the same as the width W2 of the second protruding part 1412b in the circumferential direction. Accordingly, when the second protrusions 1413b are bent, the third protruding parts 1412c may provide spaces allowing the second protrusions 1413b to be bent. That is, when the second protrusions 1413b are bent, the third protruding parts 1412c disposed in the axial direction may allow the magnets 1420 to be easily inserted by providing the spaces allowing the second protrusions 1413b to be positioned.

The protrusions 1413 may support the magnets 1420 to inhibit movement of the magnets 1420. Accordingly, in the motor 1, the magnets 1420 may be coupled to the rotor core 1410 without using an adhesive.

In addition, the protrusions 1413 may guide an arrangement of the magnets 1420.

The protrusions 1413 may include the first protrusions 1413a formed to protrude from the first protruding parts 1412a in the circumferential direction and the second protrusions 1413b formed to protrude from the second protruding parts 1412b in the circumferential direction.

The first protrusions 1413a may be disposed apart from the outer surface of the body 1411 in the radial direction. Accordingly, parts of the magnets 1420 may be disposed between the first protrusions 1413a and the outer surface of the body 1411. In this case, the inner surfaces of the first protrusions 1413a may be in contact with the first surfaces 1421 of the magnets 1420. Accordingly, the first protrusions 1413a may inhibit the magnets 1420 from being separated in the radial direction.

In addition, the first protrusions 1413a may be disposed at an uppermost side or lowermost side of the rotor core 1410 to guide insertion of the magnets 1420.

In addition, parts of the first protrusions 1413a may be disposed to overlap the second protrusions 1413b in the axial direction. In this case, the second protrusions 1413b may be disposed apart from the first protrusions 1413a in the axial direction.

The second protrusions 1413b may be disposed apart from the outer surface of the body 1411 in the radial direction. In this case, the end portions of the second protrusions 1413b may be disposed in a direction of insertion of the magnets 1420.

The second protrusions 1413b may be bent by the insertion of the magnets 1420, and one sides the second protrusions 1413b may be in contact with the second surfaces 1422 of the magnets 1420. Accordingly, the second protrusions 1413b may support the magnets 1420 using an elastic restoring force generated when bent. Accordingly, the second protrusions 1413b may inhibit the magnets 1420 from being separated in the axial direction. In this case, since parts of the second protrusions 1413b are disposed to overlap the first protruding parts 1412a in the axial direction, the second protrusions 1413b may be easily bent. In this case, the parts of the second protrusions 1413b disposed to overlap the first protruding parts 1412a in the axial direction may be regions connected to the second protruding parts 1412b.

In addition, a protruding length L2 of each of the second protrusions 1413b in the circumferential direction may be greater than a protruding length L1 of each of the first protrusions 1413a in the circumferential direction. In this case, a protruding direction of the second protrusion 1413b may be parallel to the outer surface of the body 1411.

In addition, as illustrated in FIG. 17, the end portions of the second protrusions 1413b formed to face each other in the circumferential direction may be formed on the second protruding parts 1412b to have predetermined gaps G. For example, each of the predetermined gaps G may be formed between the end portion of one second protrusion 1413b protruding from one second protruding part 1412b and the second protrusion 1413b protruding from the second protruding part 1412b which is disposed to face and adjacent to the end portion in the circumferential direction.

Meanwhile, the rotor core 1410 may further include holes 1414 formed in the protruding parts 1412. In this case, the holes 1414 may be referred to as second holes.

The holes 1414 may reduce magnetic flux leakage of the magnets 1420. In this case, the holes 1414 may be formed to pass therethrough in the axial direction. In this case, the holes 1414 may be formed in the first protruding parts 1412a but are not necessarily limited thereto. For example, the holes 1414 may be formed to extend to the second protruding parts 1412b or the third protruding parts 1412c.

The rotor core 1410 may be formed by stacking the plurality of plates having the plate shape. In this case, each of the plates may be formed to have a predetermined thickness in the axial direction.

Referring to FIGS. 13 and 14, the rotor core 1410 may be formed by stacking first plates 1410a, second plates 1410b, and third plates 1410c in the axial direction. In this case, a stacking order of the first plates 1410a, the second plates 1410b, and the third plates 1410c in the axial direction may be variously changed in consideration of coupling of the magnets 1420.

In addition, a thickness t of each of the first plates 1410a, a thickness t of each of the second plates 1410b, and a thickness t of each of the third plates 1410c in the axial direction may be the same.

However, even when the thicknesses of the first plate 1410a and the second plate 1410b are the same, the first plates 1410a of which the number is more than the number of the second plates 1410b may be disposed in consideration of a centrifugal force applied to the magnets 1420 due to driving of the motor 1. In addition, even when the thickness of third plate 1410c is the same as the thickness of each of the first plate 1410a and the second plate, the third plates of which the number is more than the number of the first plates 1410a may be disposed in consideration of bending of the second protrusions 1413b.

In this case, an example of in which the thicknesses t of the first plate 1410a, the second plate 1410b, and the third plate 1410c in the axial direction are the same has been described, but the present invention is not necessarily limited thereto. For example, since a centrifugal force may be applied to the magnets 1420 due to rotation of the motor 1, the thickness of the first plate 1410a may be greater than the thickness of the second plate 1410b. In addition, since the third plates 1410c are disposed to adjust a distance between the first plate 1410a and the second plate 1410b, or a distance between the second plates 1410b, the thickness of the third plate 1410c may be greater than the thickness of the first plate 1410a or the thickness of the second plate 1410b.

Figure 18:
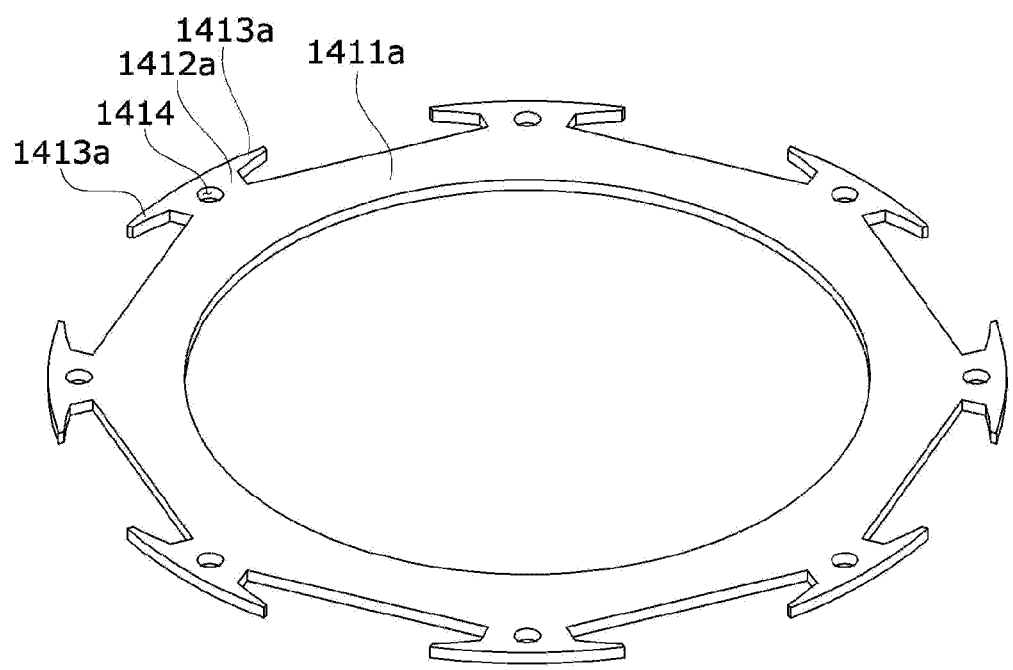
FIG. 18 is a perspective view illustrating a first plate disposed in the rotor core of another example of the rotor disposed in the motor according to the embodiment.
Figure 19:
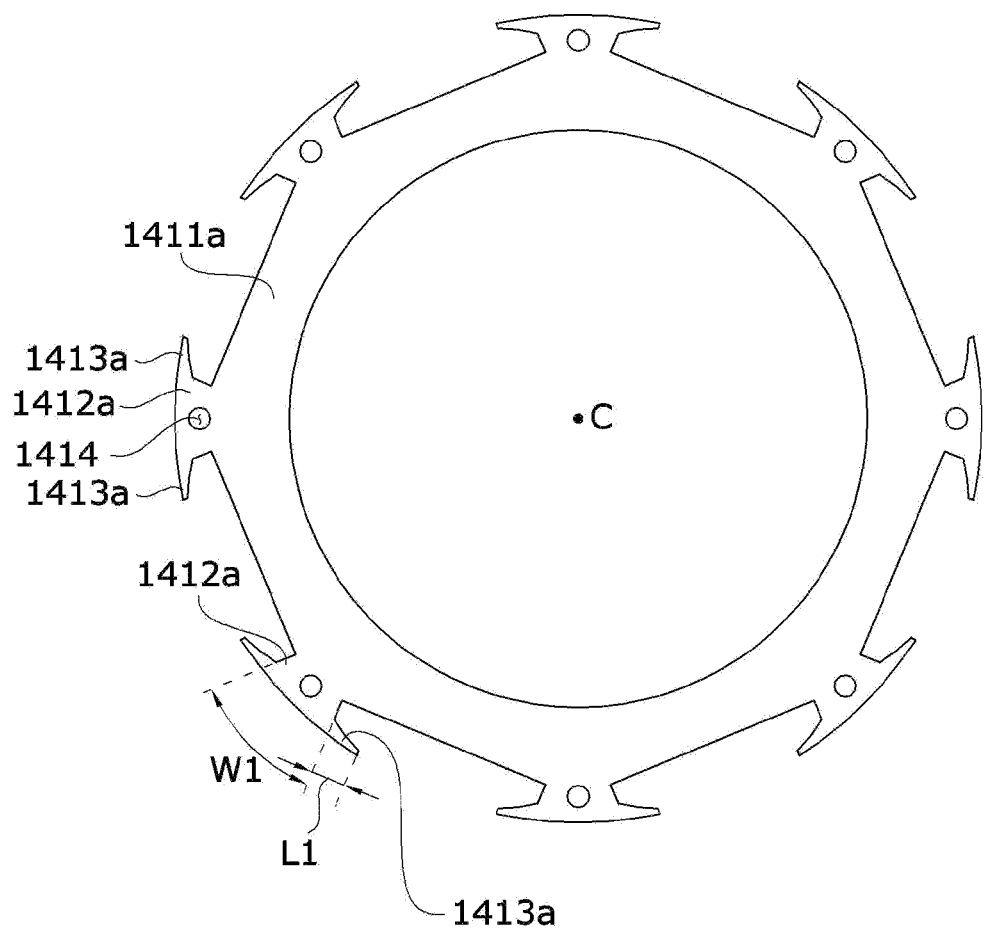
FIG. 19 is a plan view illustrating the first plate disposed in the rotor core of another example of the rotor disposed in the motor according to the embodiment.
Figure 20:
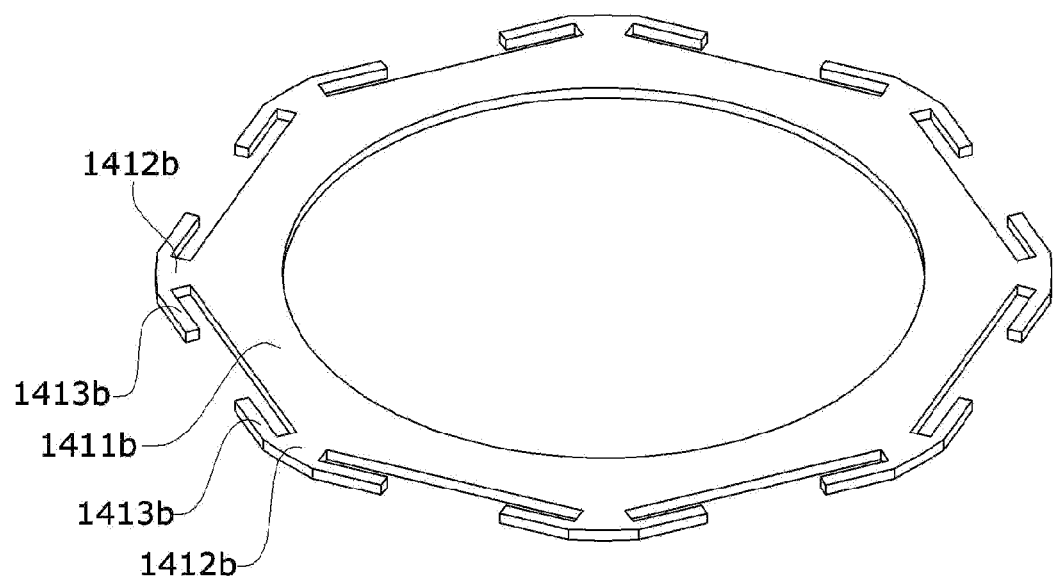
FIG. 20 is a perspective view illustrating a second plate disposed in the rotor core of another example of the rotor disposed in the motor according to the embodiment.
Figure 21:
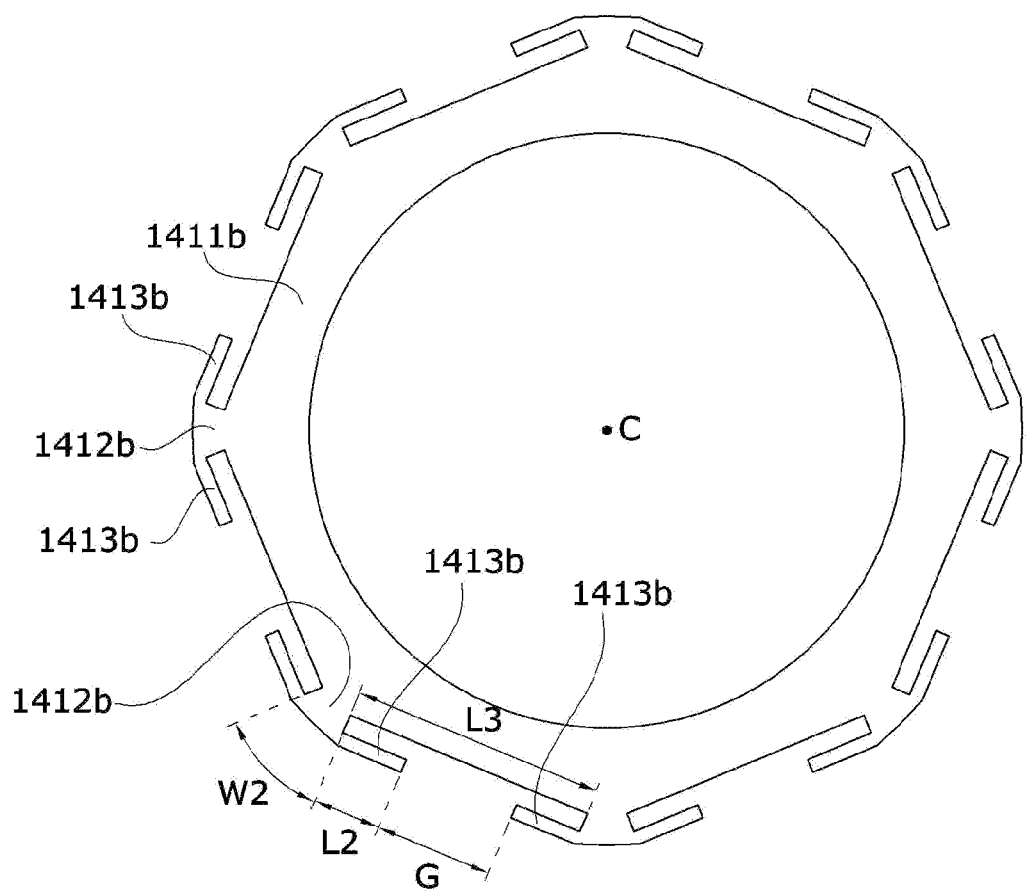
FIG. 21 is a plan view illustrating the second plate disposed in the rotor core of another example of the rotor disposed in the motor according to the embodiment.
Figure 22:
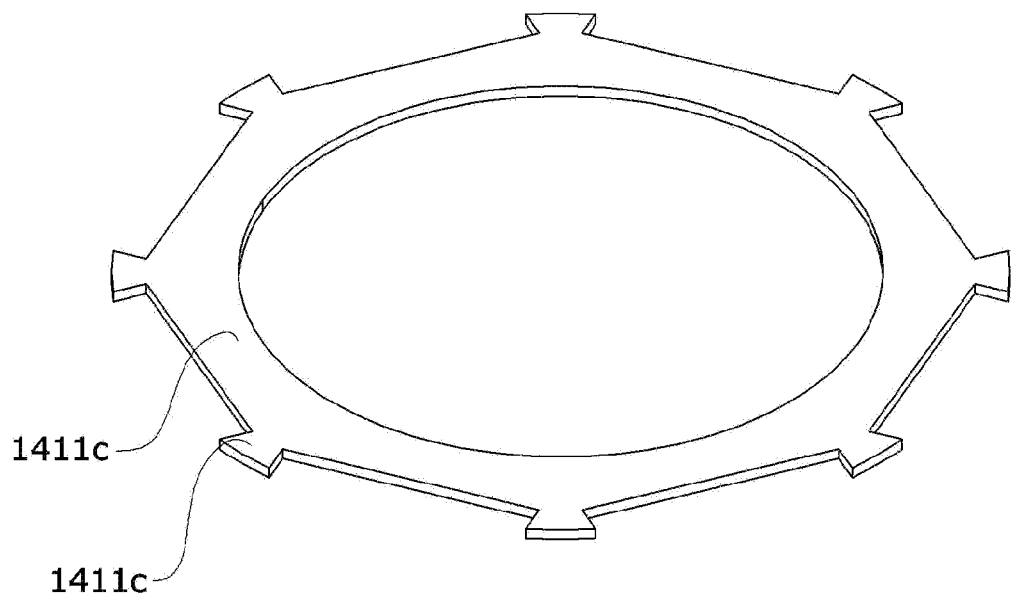
FIG. 22 is a perspective view illustrating a third plate disposed in the rotor core of another example of the rotor disposed in the motor according to the embodiment.
Figure 23:
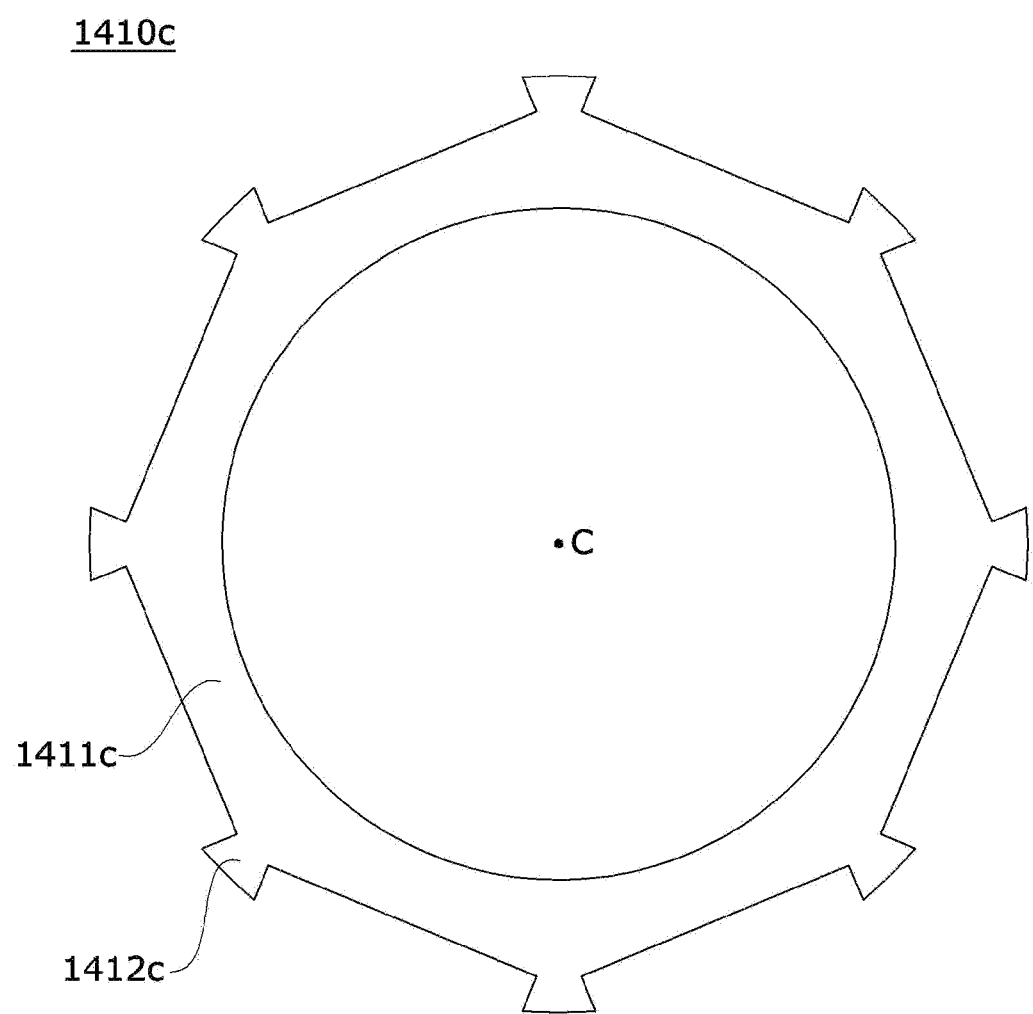
FIG. 23 is a plan view illustrating the third plate disposed in the rotor core of another example of the rotor disposed in the motor according to the embodiment.

FIG. 18 is a perspective view illustrating the first plate disposed in the rotor core of another example of the rotor disposed in the motor according to the embodiment, FIG. 19 is a plan view illustrating the first plate disposed in the rotor core of another example of the rotor disposed in the motor according to the embodiment, FIG. 20 is a perspective view illustrating the second plate disposed in the rotor core of another example of the rotor disposed in the motor according to the embodiment, FIG. 21 is a plan view illustrating the second plate disposed in the rotor core of another example of the rotor disposed in the motor according to the embodiment, FIG. 22 is a perspective view illustrating the third plate disposed in the rotor core of another example of the rotor disposed in the motor according to the embodiment, and FIG. 23 is a plan view illustrating the third plate disposed in the rotor core of another example of the rotor disposed in the motor according to the embodiment.

Referring to FIGS. 18 and 19, the first plate 1410a may include a first plate body 1411a, the first protruding parts 1412a protruding from the first plate body 1411a in the radial direction, and first protrusions 1413a protruding from end portions of the first protruding parts 1412a in the circumferential direction. In addition, the first plate 1410a may include the holes 1414 formed in the first protruding parts 1412a.

A hole may be formed in a central portion of the first plate body 1411a in consideration of coupling of the shaft 500. In addition, the first plate body 1411a may be formed in a shape the same as a shape of a second plate body 1411b of the second plate 1410b and a shape of a third plate body 1411c of the third plate 1410c.

The first protruding parts 1412a and the first protrusions 1413a may guide insertion of the magnets 1420. Accordingly, the first plate 1410a may be disposed at the uppermost end or lowermost end when the plates are stacked.

The first protruding parts 1412a may be formed to have the predetermined width W1 in the circumferential direction. In addition, the plurality of first protruding parts 1412a may be disposed apart from each other on the first plate body 1411a in the circumferential direction. Accordingly, the magnets 1420 may be disposed between the first protruding parts 1412a.

The first protrusions 1413a may be formed to protrude from the first protruding parts 1412a in the circumferential direction. In this case, the first protrusions 1413a may be disposed apart from an outer surface of the first plate body 1411a in the radial direction. Accordingly, the magnets 1420 may be disposed between the outer surface of the first plate body 1411a and the inner surfaces of the first protrusions 1413a.

Accordingly, the first protrusions 1413a may inhibit the magnets 1420 from being separated in the radial direction.

The second plates 1410b may be disposed between the first plates 1410a in the axial direction.

In addition, the plurality of second plates 1410b may be disposed apart from each other in the axial direction, and the distance between the second plates 1410b in the axial direction may be adjusted in consideration of bending of the second protrusions 1413b of the second plates 1410b.

For example, the plurality of second plates 1410b may be disposed apart from the first plates 1410a by the third plates 1410c in the axial direction. In this case, a separation distance D2 between the second plates 1410b in the axial direction may be greater than or equal to the protruding length L2 of the second protrusion 1413b in the circumferential direction in consideration of bending of the second protrusion 1413b.

In addition, a separation distance D1 in the axial direction between the second plate 1410b disposed at a lowermost side among the plurality of second plates 1410b and the first plate 1410a disposed at a lower side of the rotor core 1410 in the axial direction may be greater than or equal to the length L2 of the second protrusion 1413b in the circumferential direction.

Referring to FIGS. 20 and 21, the second plate 1410b may include the second plate body 1411b, the second protruding parts 1412b protruding from the second plate body 1411b in the radial direction, and the second protrusions 1413b protruding from end portions of the second protruding parts 1412b in the circumferential direction.

When the plates are stacked, the second plates 1410b may be disposed between the first plates 1410a or the third plates 1410c.

A hole may be formed in a central portion of the second plate body 1411b in consideration of coupling of the shaft 500.

The plurality of second protruding parts 1412b may be disposed apart from each other on the second plate body 1411b in the circumferential direction.

In addition, the second protruding part 1412b may be formed to have the predetermined width W2 in the circumferential direction. In this case, the width W2 of the second protruding part 1412b in the circumferential direction may be smaller than the width W1 of the first protruding part 1412a in the circumferential direction. Accordingly, when the magnets 1420 are coupled to the rotor core 1410, the second protruding parts 1412b may be disposed apart from the magnets 1420 in the circumferential direction.

The second protrusions 1413b may be formed to protrude from the second protruding parts 1412b in the circumferential direction. In this case, the second protrusions 1413b may be disposed apart from an outer surface of the second plate body 1411b in the radial direction.

In addition, the second protrusion 1413b may be formed to have the predetermined protruding length L2. In this case, the protruding length L2 may be greater than the thickness t of the plate in consideration of bending of the second protrusion 1413b and an elastic restoring force due to the bending. For example, the protruding length L2 may be greater than the thickness t of the second plate 1410b. The protruding length L2 may be 4 or more times the thickness t of the second plate 1410b. In this case, the protruding length L2 may be smaller than half (L3/2) of the length of the outer surface of the second plate body 1411b in contact with third surfaces 1423 of the magnets 1420. Accordingly, the gaps G may be disposed between the end portions of the second protrusions 1413b in the circumferential direction.

In addition, the protruding direction of the second protrusion 1413b may be parallel to the outer surface of the body 1411.

In addition, the end portions of the second protrusions 1413b formed to face each other may be formed to have the predetermined gaps G in the circumferential direction.

Accordingly, when the magnets 1420 are inserted into the rotor core 1410, the second protrusions 1413b may be bent in the axial direction. Accordingly, one sides of the second protrusions 1413b may be in contact with the second surfaces 1422 of the magnets 1420 to inhibit the magnets 1420 from being separated in the axial direction.

The third plates 1410c may be disposed between the first plate 1410a and the second plate 1410b or between the second plates 1410b in the axial direction.

In addition, the plurality of third plates 1410c may be disposed in the axial direction. In this case, the third plates 1410c may be disposed between the first plate 1410a and the second plate 1410b or between the second plates 1410b to adjust the distance between the first plate 1410a and the second plate 1410b in the axial direction or the distance between the second plates 1410b in the axial direction.

Referring to FIGS. 22 and 23, the third plate 1410c may include the third plate body 1411c and the third protruding parts 1412c protruding from the third plate body 1411c in the radial direction.

A hole may be formed in a central portion of the third plate body 1411c in consideration of coupling of the shaft 500.

The plurality of third protruding parts 1412c may be disposed apart from each other on the plate body 1411c in the circumferential direction. In this case, the third protruding part 1412c may be formed in the same shape as the second protruding part 1412*b*. Accordingly, the width of the third protruding part 1412*c* in the circumferential direction may be the same as the width W2 of the second protruding part 1412*b* in the circumferential direction.

The magnets 1420 may generate a rotating magnetic field with the coils 330 wound around the stator 300. The magnets 1420 may be disposed so that N-poles and S-poles are alternately disposed with respect to the shaft 500 in the circumferential direction.

Accordingly, the rotor 1400 rotates due to an electrical interaction between the coils 330 and the magnets 1420, and when the rotor 1400 rotates, the shaft 500 rotates so that a driving force of the motor 1 is generated.

In addition, the magnets 1420 may include the first surfaces 1421 disposed in contact with the first protrusions 1413*a*, the second surfaces 1422 disposed in contact with the second protrusions 1413*b*, and the third surfaces 1423 disposed at an opposite side of the first surfaces 1421 in the radial direction.

While the present invention has been described above with reference to exemplary embodiments, it may be understood by those skilled in the art that various modifications and changes of the present invention may be made within a range not departing from the spirit and scope of the present invention defined by the appended claims.

REFERENCE NUMERALS

1: MOTOR, 100: HOUSING, 200: COVER, 300: STATOR, 400, 1400: ROTOR, 500: SHAFT, 600: BUSBAR, 700: SENSOR PART

The invention claimed is:

1. A motor comprising:
a stator; and
a rotor disposed inside the stator,
wherein the rotor includes a rotor core and a magnet disposed on an outer side of the rotor core,
the rotor core is formed by stacking a plurality of plates,
the plates include first plates and second plates,
each of the first plates includes a first plate body, a first protruding part protruding from the first plate body in a radial direction, and a first protrusion protruding from an end portion of the first protruding part in a circumferential direction,
each of the second plates includes a second plate body, a second protruding part protruding from the second plate body in the radial direction, and a second protrusion protruding from an end portion of the second protruding part in the circumferential direction, and
when the magnet is inserted into the rotor core, a part of the magnet is disposed between the first protrusion and an outer surface of the body in the radial direction, and the second protrusion is bent in the axial direction to be in contact with a second surface of the magnet in the circumferential direction.

2. The motor of claim 1, wherein a width (W1) of the first protruding part in the circumferential direction is greater than a width (W2) of the second protruding part in the circumferential direction.

3. The motor of claim 2, wherein the second protruding part is disposed apart from the second surface of the magnet in the circumferential direction.

4. The motor of claim 2, wherein a part of the second protrusion is disposed to overlap the first protruding part in the axial direction.

5. The motor of claim 2, wherein the first protruding part includes a hole formed to pass through the protruding part in the axial direction.

6. The motor of claim 1, wherein:
the second plate is disposed between the first plates;
the plates include a third plate disposed between the first plate and the second plate or between the second plates;
the third plate includes a third plate body and a third protruding part protruding from the third plate body in the radial direction; and
the third protruding part is formed in the same shape as the second protruding part.

7. The motor of claim 6, wherein:
the plurality of second plates are disposed apart from each other in the axial direction by the first plate and the third plate; and
a separation distance (D2) between the second plates is greater than or equal to a protruding length (L2) of the second protrusion in the circumferential direction.

8. The motor of claim 1, wherein end portions of the second protrusions which are disposed to face each other in the circumferential direction are formed to have a predetermined gap (G).

9. The motor of claim 8, wherein a protruding length (L2) of the second protrusion in the circumferential direction is greater than a thickness (t) of each of the plates.

\* \* \* \* \*